US012638335B2

(12) United States Patent
Nakatsuji et al.

(10) Patent No.: US 12,638,335 B2
(45) Date of Patent: May 26, 2026

(54) SENSOR ELEMENT, AND SENSOR DEVICE

(71) Applicant: The University of Tokyo, Tokyo (JP)

(72) Inventors: Satoru Nakatsuji, Tokyo (JP); Ryota Uesugi, Tokyo (JP); Tomoya Higo, Tokyo (JP)

(73) Assignee: The University of Tokyo, Tokyo (JP)

( * ) Notice: Subject to any disclaimer, the term of this patent is extended or adjusted under 35 U.S.C. 154(b) by 230 days.

(21) Appl. No.: 18/287,234

(22) PCT Filed: Apr. 12, 2022

(86) PCT No.: PCT/JP2022/017602
§ 371 (c)(1),
(2) Date: Nov. 30, 2023

(87) PCT Pub. No.: WO2022/224879
PCT Pub. Date: Oct. 27, 2022

(65) Prior Publication Data
US 2024/0210248 A1 Jun. 27, 2024

(30) Foreign Application Priority Data

Apr. 19, 2021 (JP) ................................. 2021-070428

(51) Int. Cl.
*G01J 5/12* (2006.01)
(52) U.S. Cl.
CPC ...................................... *G01J 5/12* (2013.01)
(58) Field of Classification Search
None
See application file for complete search history.

(56) References Cited

U.S. PATENT DOCUMENTS

| | | | |
|---|---|---|---|
| 6,750,452 B1 | 6/2004 | Morita | |
| 2022/0052247 A1* | 2/2022 | Kirihara | ................. H10N 15/20 |
| 2022/0246820 A1* | 8/2022 | Nakatsuji | ............... H10N 15/00 |
| 2022/0336724 A1* | 10/2022 | Noda | ..................... H02N 11/00 |
| 2023/0180614 A1* | 6/2023 | Nakatsuji | ............... H10N 15/20 |
| | | | 310/306 |
| 2023/0270009 A1* | 8/2023 | Ishida | ................... H10N 15/00 |
| | | | 310/306 |

FOREIGN PATENT DOCUMENTS

| | | | |
|---|---|---|---|
| JP | 3-236288 A | 10/1991 | |
| JP | 9-133578 A | 5/1997 | |

(Continued)

OTHER PUBLICATIONS

International Search Report dated Jul. 5, 2022, issued in counterpart International Application No. PCT/JP2022/017602, with English Translation. (6 pages).

(Continued)

*Primary Examiner* — Marcus H Taningco
(74) *Attorney, Agent, or Firm* — WHDA, LLP

(57) ABSTRACT

A sensor element for detecting electromagnetic waves includes a substrate, an absorber configured to absorb the electromagnetic waves and generate heat, and at least one thermoelectric conversion element disposed between the substrate and the absorber to support a part of the absorber and configured to generate an electromotive force from the heat generated in the absorber by a transverse thermoelectric effect.

6 Claims, 17 Drawing Sheets

(56) References Cited

FOREIGN PATENT DOCUMENTS

| JP | 11-51762 A | 2/1999 |
|---|---|---|
| JP | 2003-166876 A | 6/2003 |
| JP | 2003-177064 A | 6/2003 |
| JP | 2012-173236 A | 9/2012 |
| JP | 2017-37999 A | 2/2017 |
| JP | 6095856 B2 | 3/2017 |
| JP | 2020-107743 A | 7/2020 |
| JP | 2020153668 A * | 9/2020 |
| WO | 2021/059391 A1 | 4/2021 |

OTHER PUBLICATIONS

Zhou et al., "Development of a flexible heat flow sensor using the anomalous Nernst effect", 43, (2019), p. 81. Cited in ISR. w/English Translation. (4 pages).

Suzuki et al., "Fermi-Level-Controlled Semiconducting-Separated Carbon Nanotube Films for Flexible Terahertz Imagers", ACS Appl. Nano Mater. (2018), 1, pp. 2469-2475. Cited in Specification. w/English Translation. (7 pages).

Tao et al., "Highly flexible wide angle of incidence terahertz metamaterial absorber: Design, fabrication, and characterization", Physical Review B 78, 241103(R), (2008), Cited in Specification. w/English Translation. (4 pages).

Yu et al., "Perfect subwavelength fishnetlike metamaterial-based film terahertz absorbers", Physical Review B 82, 205117, (2010), Cited in Specification. w/English Translation. (6 pages).

Extended (Supplementary) European Search Report dated Feb. 28, 2025, issued in counterpart EP Application No. 22791653.3. (8 pages).

Jeon, C. et al., Plasmon-Enhanced Photodetection in Ferromagnet/ Nonmagnet Spin Thermoelectric Structures; Advanced Functional Materials, vol. 28, No. 40, 2018 (6 pages); cited in Extended European Search Report.

Uchida, K. et al., Transverse thermoelectric generation using magnetic materials, Applied Physics Letters, vol. 118, No. 14, 2021 (8 pages); cited in Extended European Search Report.

Notice of Reasons for Refusal dated Jan. 6, 2026, issued in counterpart JP Application No. 2021-070428, with English translation. (11 pages).

* cited by examiner

SENSOR ELEMENT, AND SENSOR DEVICE

TECHNICAL FIELD

The present invention relates to a sensor element and a sensor device for detecting electromagnetic waves.

BACKGROUND ART

In recent years, an electromagnetic wave sensor has been proposed which detects electromagnetic waves such as near-infrared light, terahertz waves, and microwaves by absorbing the electromagnetic waves using an absorber and by converting the generated heat into an electrical signal using a thermoelectric conversion element by the Seebeck effect (e.g., See Patent Literature 1).

CITATION LIST

Patent Literature

Patent Literature 1: Japanese Patent No. 6095856

SUMMARY OF INVENTION

Technical Problem

The Seebeck effect generates an electromotive force in the same direction as a temperature difference direction, and thus there is a need to fabricate the sensor with a structure in which p-type modules and n-type modules are alternately arranged and stand in a direction perpendicular to a surface of a heat source. Therefore, the Seebeck effect-based electromagnetic wave sensors have a complicated three-dimensional structure, which leads to a rise in manufacturing cost and makes it difficult to achieve large-area and thin-film devices.

The invention has been made in view of the foregoing, and an object of the invention is to realize a simply structured and large-area sensor element and device for detecting electromagnetic waves using a thermoelectric conversion element.

Solution to Problem

A sensor element according to one embodiment of the invention is a sensor element for detecting electromagnetic waves and includes a substrate, an absorber configured to absorb the electromagnetic waves and generate heat, and at least one thermoelectric conversion element disposed between the substrate and the absorber to support a part of the absorber and configured to generate an electromotive force from the heat generated in the absorber by a transverse thermoelectric effect.

A sensor device according to one embodiment of the invention includes a substrate and a plurality of sensor structures arranged in a matrix on the substrate. Each of the plurality of sensor structures includes an absorber configured to absorb electromagnetic waves and generate heat, and at least one thermoelectric conversion element disposed between the substrate and the absorber to support a part of the absorber and configured to generate an electromotive force from the heat generated in the absorber by a transverse thermoelectric effect.

Advantageous Effects of Invention

According to the invention, a sensor element for detecting electromagnetic waves includes a thermoelectric conversion element which exhibits a transverse thermoelectric effect. With this feature, it is possible to realize a simply structured and large-area sensor element and device.

DESCRIPTION OF EMBODIMENTS

Exemplary embodiments of the invention will be described below with reference to the accompanying drawings. The same reference signs are used to designate the same or similar elements throughout the drawings. The drawings are schematic, and a relationship between a planar dimension and a thickness and a thickness ratio between members are different from reality. Needless to say, there are portions having different dimensional relationships or ratios between the drawings.

First Embodiment

First, a first embodiment of the invention will be described with reference to FIGS. 1 to 6.

Figure 1:
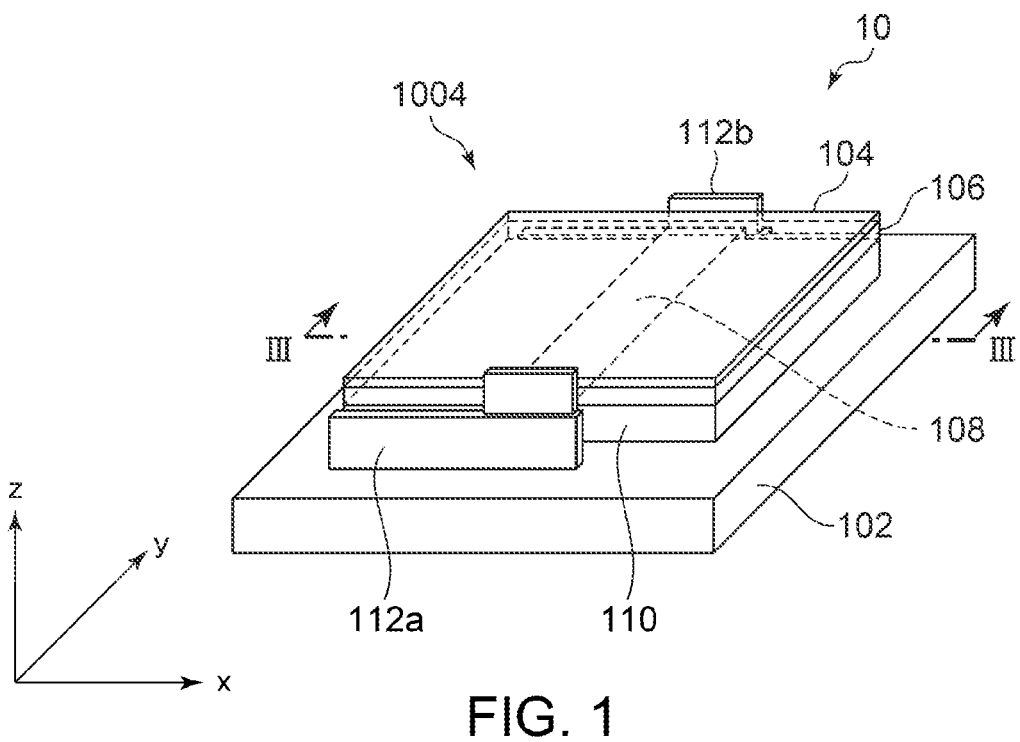
FIG. 1 is a schematic perspective view of a configuration of a sensor element of a first embodiment.
Figure 2:
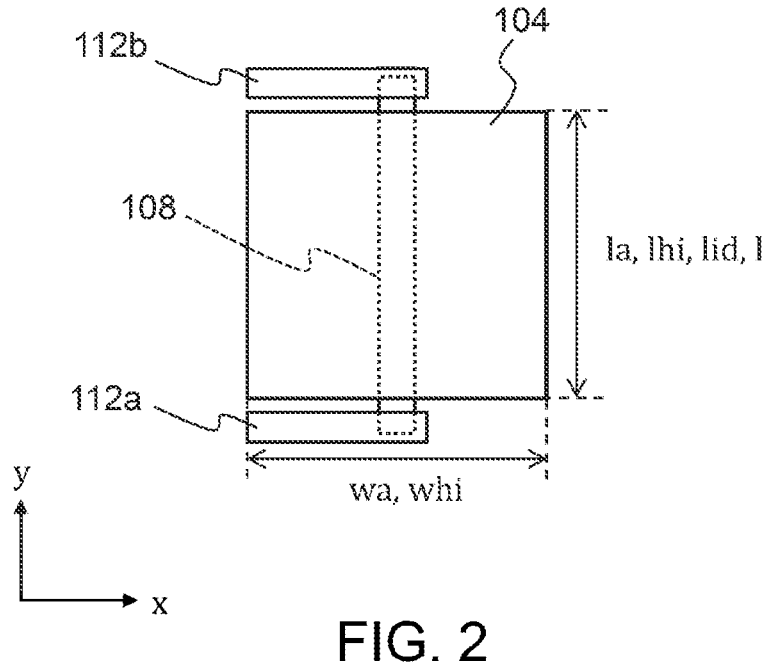
FIG. 2 is a plan view of a sensor structure shown in FIG. 1.
Figure 3:
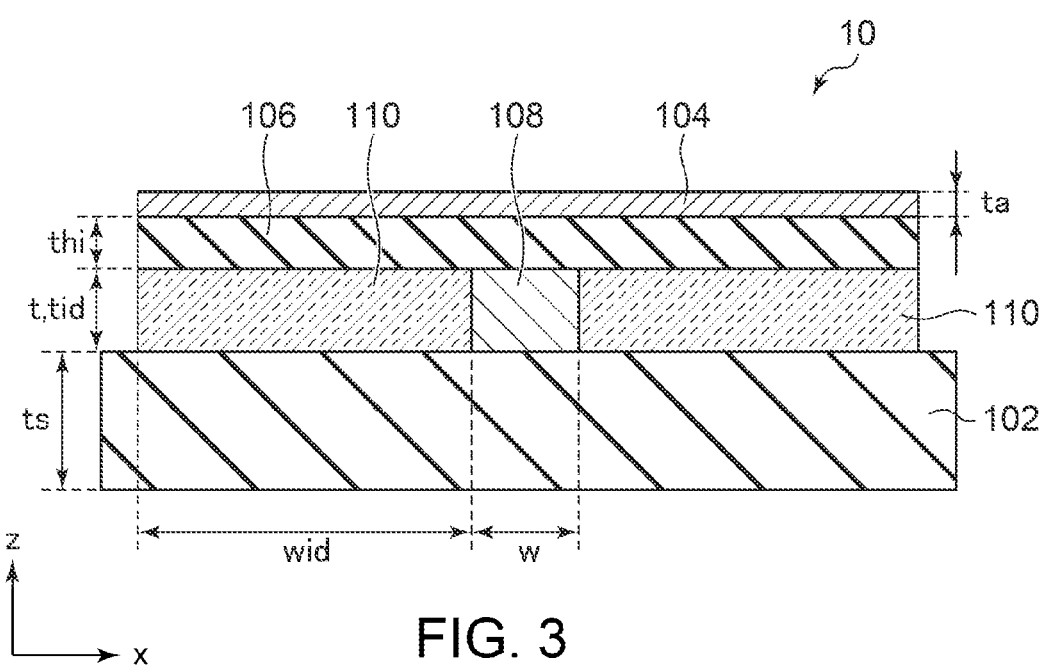
FIG. 3 is a cross-sectional view of FIG. 1 along the line III-III.

FIG. 1 shows a perspective view of a sensor element 10 of the first embodiment. The sensor element 10 is an element for detecting electromagnetic waves, and includes a substrate 102 and a sensor structure 1004 disposed on the substrate 102, as shown in FIG. 1. FIG. 2 shows a plan view of the sensor structure 1004, and FIG. 3 shows a cross-sectional view of FIG. 1 taken along the line III-III.

The sensor structure 1004 includes a rectangular cuboid shaped thermoelectric conversion element 108, a pair of low thermal conductive insulating films 110 disposed on both sides of the thermoelectric conversion element 108 in a width direction (x-direction) to be bilaterally symmetrical, a pair of electrodes 112a and 112b disposed at both ends of the thermoelectric conversion element 108 in a longitudinal direction (y-direction), a high thermal conductive insulating film 106 disposed to cover the thermoelectric conversion element 108 and the low thermal conductive insulating films 110, and an absorber 104 disposed on the high thermal conductive insulating film 106.

The substrate 102 is made of a material such as AlN, MgO, or $Al_2O_3$.

The absorber 104 is a light receiving element that absorbs the electromagnetic waves and generates heat. The absorber 104 is a known absorber which is made of, for example, NiCr, a ferrite material (see Japanese Patent Application Laid-Open No. 2017-037999), a carbon nanotube thin film (see ACS Appl. Nano Mater. 2018, 1, 6, 2469-2475), or a metamaterial (see Phys. Rev. B 78, 241103 (R) (2008); Phys. Rev. B 82, 205117 (2010)). The electromagnetic waves absorbed by the absorber 104 are not restrictive as long as the electromagnetic waves are in a target wavelength band such as near-infrared light, terahertz waves, or microwaves, and generate heat.

The high thermal conductive insulating film 106 is made of an insulating material with a higher thermal conductivity than that of a material of the thermoelectric conversion elements 108. Examples of the material of the high thermal conductive insulating film 106 include AlN, SiC, SiN, or BN.

As shown in FIGS. 1 and 3, the thermoelectric conversion element 108 partially supports the absorber 104 and the high thermal conductive insulating film 106. A part of the heat generated in the absorber 104 flows into the thermoelectric conversion element 108 through the high thermal conductive insulating film 106, and a transverse thermoelectric effect represented by an anomalous Nernst effect generates an electromotive force in a direction (y-direction) perpendicular to both a temperature gradient (z-direction) and magnetization (x-direction). Examples of a material exhibiting the anomalous Nernst effect and constituting the thermoelectric conversion element 108 include Fe—Ga alloys such as $Fe_3Ga$, Fe—Al alloys such as $Fe_3Al$, $CO_2MnGa$, Fe—Ni alloys, $Mn_3Sn$, and $Mn_3Ge$.

The two low thermal conductive insulating films 110 are interlayer dielectric films having the same shape (rectangular cuboid shape) and the same size and disposed on both sides of the thermoelectric conversion element 108 in the width direction and between the substrate 102 and the high thermal conductive insulating film 106. The low thermal conductive insulating film 110 is made of an insulating material with a lower thermal conductivity than that of the material of the thermoelectric conversion elements 108. Examples of the material of the low thermal conductive insulating film 110 include $SiO_2$.

The electrodes 112a and 112b are made of a metal such as Cu, and detect the electromotive force generated in the thermoelectric conversion element 108 by the transverse thermoelectric effect. The electromotive force signal is amplified by a peripheral circuit (not shown) to detect the electromagnetic waves and to measure the intensity.

As shown in FIGS. 1 and 2, the electrodes 112*a* and 112*b* cover both ends of the thermoelectric conversion element 108. The larger a contact area between the electrodes 112*a* and 112*b* and the thermoelectric conversion element 108, the smaller the contact resistance. As shown in FIG. 2, the electrodes 112*a* and 112*b* are located separately from the absorber 104, the high thermal conductive insulating film 106, and the low thermal conductive insulating films 110.

FIGS. 1 and 2 show that in a plane (x-y plane) perpendicular to a heat current, the absorber 104 and the high thermal conductive insulating film 106 have a square shape, and the two low thermal conductive insulating films 110 on both sides of the thermoelectric conversion element 108 have a rectangular shape, but these shapes are not restrictive.

As shown in FIG. 2, in the y-direction, a length la of the absorber 104, a length lhi of the high thermal conductive insulating film 106, and a length lid of the low thermal conductive insulating film 110 are equal to each other. The actual length of the thermoelectric conversion element 108 in the longitudinal direction (y-direction) is longer than la, lhi, and lid. However, a portion where the thermoelectric conversion element 108 is covered with the high thermal conductive insulating film 106 and the absorber 104 contributes to the generation of the electromotive force, and thus the length of this portion is hereinafter defined as the length 1 of the thermoelectric conversion element 108 (la=lhi=lid=1).

As shown in FIG. 2, in the x-direction, a width wa of the absorber 104 is equal to a width whi of the high thermal conductive insulating film 106. As shown in FIG. 3, when a width of the thermoelectric conversion element 108 is denoted by w and a width of a single low thermal conductive insulating film 110 is denoted by wid, wa=whi=w+2wid is satisfied.

As shown in FIG. 3, in the z-direction, let the thicknesses of the absorber 104, the high thermal conductive insulating film 106, the thermoelectric conversion element 108, the low thermal conductive insulating film 110, and the substrate 102 be denoted by ta, thi, t, tid, and ts, respectively. The thickness t of the thermoelectric conversion element 108 is equal to the thickness tid of each of the low thermal conductive insulating films 110.

Next, as a measure indicating performance of the sensor elements of the first embodiment and the subsequent embodiments to be described later, sensitivity and noise equivalent power (hereinafter referred to as "NEP") will be explained. When a voltage (V) generated in the sensor element is denoted by V and heat current density (W/m²) is denoted by q, V/q is defined as in Equation (1).

$$\frac{V}{q} =$$

(1)

$$\frac{S_{ANE}}{\kappa_{ANE}} l \cdot \frac{p_{therm}}{p_{area}} = \frac{S_{ANE}}{\kappa_{ANE}} l \cdot \frac{\kappa_{ANE} A_{ANE}}{\sum_i \kappa_i A_i} \cdot \frac{A_{rec}}{A_{ANE}} = \frac{S_{ANE} l}{\sum_i \kappa_i A_i} A_{rec} [V/(W/m^2)]$$

Here, $S_{ANE}$ is a Nernst coefficient (μV/K) of the thermoelectric conversion element, $\kappa_{ANE}$ is a thermal conductivity (W/mK) of the thermoelectric conversion element, $p_{therm}$ is a thermal collection rate, $p_{area}$ is a rate of the thermoelectric conversion element in a thermal conductive cross-sectional area of the sensor element, $A_{ANE}$ is an area (m²) of the thermoelectric conversion element, and $A_{rec}$ is an area (m²) of the absorber. l denotes the length (m) of the thermoelectric conversion element in the longitudinal direction, as described above. $\kappa_i$ (i=1, 2) denotes the thermal conductivities (W/mK) of the thermoelectric conversion element (i=1) and the low thermal conductive insulating film (i=2), and $A_r$ (i=1, 2) denotes the areas (m²) of the thermoelectric conversion element (i=1) and the low thermal conductive insulating film (i=2). It is noted that, in this description, the terms "thermal conductive cross-sectional area" and "area" refer to the areas on the plane (x-y plane in FIGS. 1 and 2) perpendicular to the heat current.

When the amount of heat (W) generated in the absorber is denoted by Q, the sensitivity V/Q of a single sensor element is given by Equation (2) from Equation (1).

$$\frac{V}{Q} = \frac{S_{ANE} l}{\sum_i \kappa_i A_i} [V/W]$$

(2)

It is noted that the sensitivity of the entire sensor element can be obtained by multiplying the sensitivity V/Q shown in Equation (2) by a light-to-heat conversion efficiency $p_r$ of the absorber. Equation (2) suggests that the higher the thermal resistance of the entire sensor element, the higher the sensitivity.

When thermal noise (V) caused by an element resistance is denoted by $V_{noise}$, NEP is defined as $V_{noise}/(V/Q)$. Thermal noise $V_{noise}$ is defined as in Equation (3).

$$V_{noise} = \sqrt{4k_B TR} = \sqrt{\frac{4k_B T\rho l}{tw}} [V/\sqrt{Hz}]$$

(3)

Here, $k_B=1.38\times10^{-23}$ (J/K) is the Boltzmann constant, T is temperature (K) of the thermoelectric conversion element, R is an electrical resistance (Q) of the thermoelectric conversion element, p is an electrical resistivity (μΩcm) of the thermoelectric conversion element, and t and w are the thickness (m) and width (m) of the thermoelectric conversion element, respectively (see FIG. 3).

Therefore, from Equations (2) and (3), the NEP of a single sensor element is given by Equation (4).

$$NEP = \frac{V_{noise}}{V/Q} = \frac{\sum_i \kappa_i A_i}{S_{ANE}} \sqrt{\frac{4k_B T\rho}{twl}} [W/\sqrt{Hz}]$$

(4)

It is noted that the NEP of the entire sensor element can be obtained by dividing the NEP shown in Equation (4) by the conversion efficiency $p_r$ of the absorber.

Equations (2) and (4) suggest that the higher the thermal resistance of the entire sensor element and the larger the volume twl of the thermoelectric conversion element, the better the sensitivity of the sensor element and the lower the NEP.

Next, a method for fabricating the sensor element 10 of the first embodiment (hereinafter referred to as a "first fabrication method") will be described with reference to FIGS. 4A to 4H.

Figure 4A:
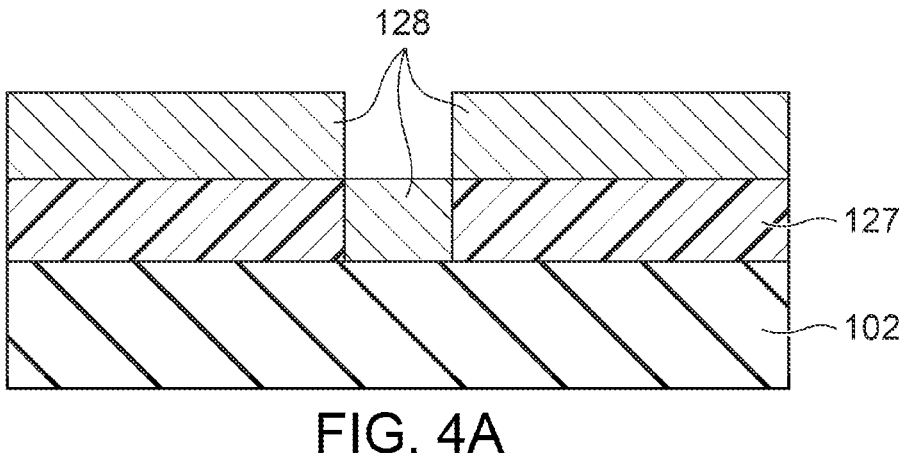
FIG. 4A is a schematic cross-sectional view of one process of a method for fabricating the sensor element of the first embodiment.
Figure 4B:
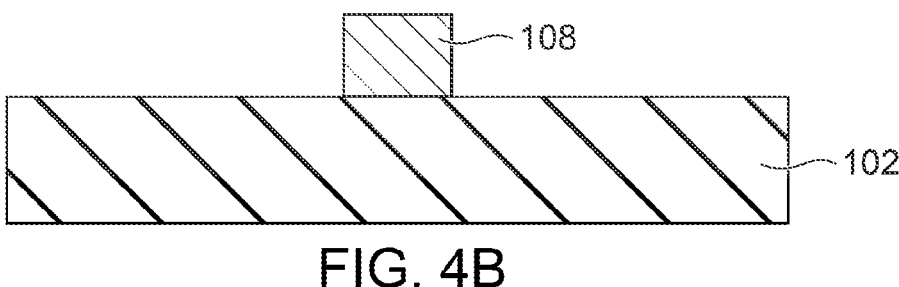
FIG. 4B is a schematic cross-sectional view of one process of the method for fabricating the sensor element of the first embodiment.

First, a resist is applied onto any substrate 102, and a resist pattern 127 with regions of the thermoelectric conversion element 108 opened is formed by a photolithography process. Then, as shown in FIG. 4A, a metal film 128 made of a material exhibiting the transverse thermoelectric effect is formed by, for example, a sputtering method. Next, as shown in FIG. 4B, the metal film 128 on the resist pattern 127 is lifted off together with the resist pattern 127 to obtain the thermoelectric conversion element 108.

For example, an $Fe_3Ga$ thin film can be deposited on any substrate 102 at room temperature by DC magnetron sputtering. Here, the deposition can be performed with a base vacuum of $10^{-4}$ Pa or less under the deposition pressure range of 0.1 Pa to 1.5 Pa in a chamber. For example, the base vacuum may be $5 \times 10^{-7}$ Pa, and the deposition pressure may be 0.5 Pa.

Figure 4C:
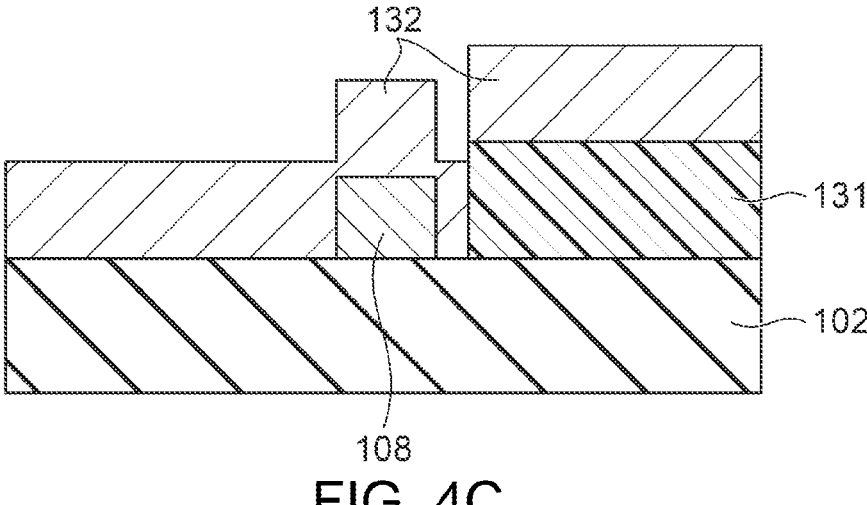
FIG. 4C is a schematic cross-sectional view of one process of the method for fabricating the sensor element of the first embodiment.
Figure 4D:
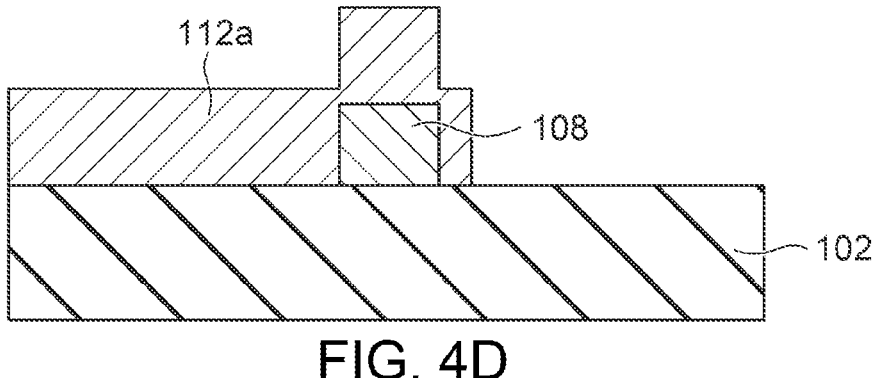
FIG. 4D is a schematic cross-sectional view of one process of the method for fabricating the sensor element of the first embodiment.

After formation of the thermoelectric conversion element 108, a resist is applied, and a resist pattern 131 with regions of the electrodes 112a and 112b opened is formed by the photolithography process. Then, as shown in FIG. 4C, a metal film 132 made of a material of the electrodes 112a and 112b is formed by, for example, electron beam (EB) deposition. Next, as shown in FIG. 4D, the metal film 132 on the resist pattern 131 is lifted off together with the resist pattern 131 to obtain the electrodes 112a and 112b.

Figure 4E:
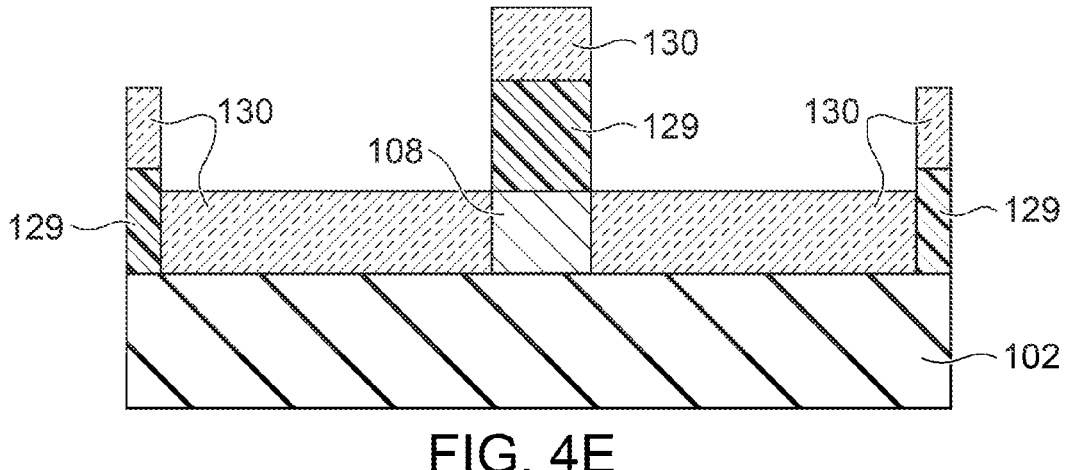
FIG. 4E is a schematic cross-sectional view of one process of the method for fabricating the sensor element of the first embodiment.
Figure 4F:
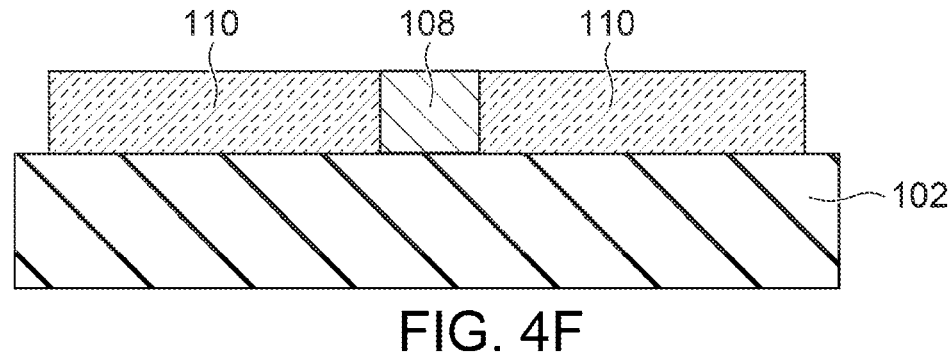
FIG. 4F is a schematic cross-sectional view of one process of the method for fabricating the sensor element of the first embodiment.

After formation of the electrodes 112a and 112b, a resist is applied, and a resist pattern 129 with regions of the low thermal conductive insulating films 110 opened is formed by the photolithography process. Then, as shown in FIG. 4E, an insulating film 130 made of a material of the low thermal conductive insulating films 110 is formed with the same thickness as the thermoelectric conversion elements 108 by, for example, a sputtering method. Next, as shown in FIG. 4F, the insulating film 130 on the resist pattern 129 is lifted off together with the resist pattern 129 to obtain the low thermal conductive insulating films 110. It is noted that the low thermal conductive insulating films 110 may be formed by a spin-on-glass method instead of the sputtering method.

Figure 4G:
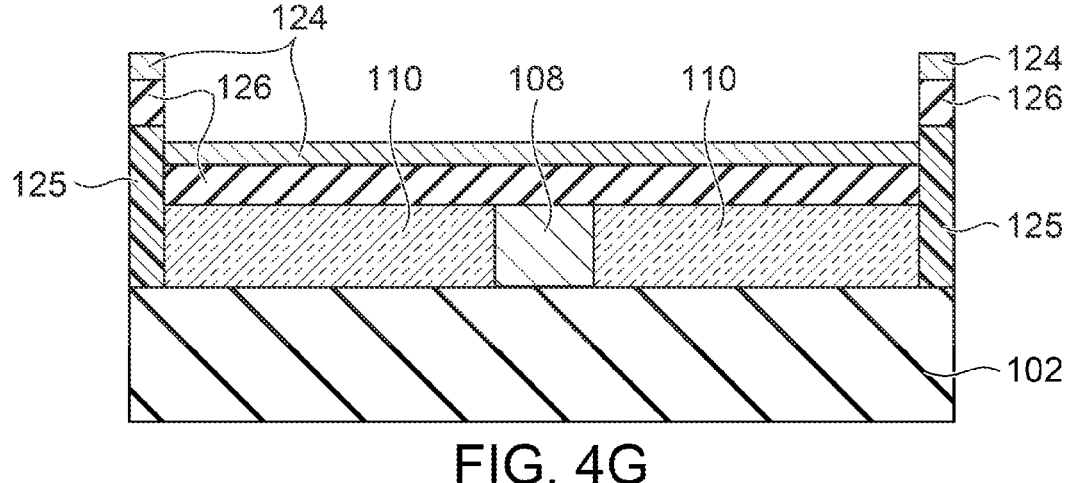
FIG. 4G is a schematic cross-sectional view of one process of the method for fabricating the sensor element of the first embodiment.
Figure 4H:
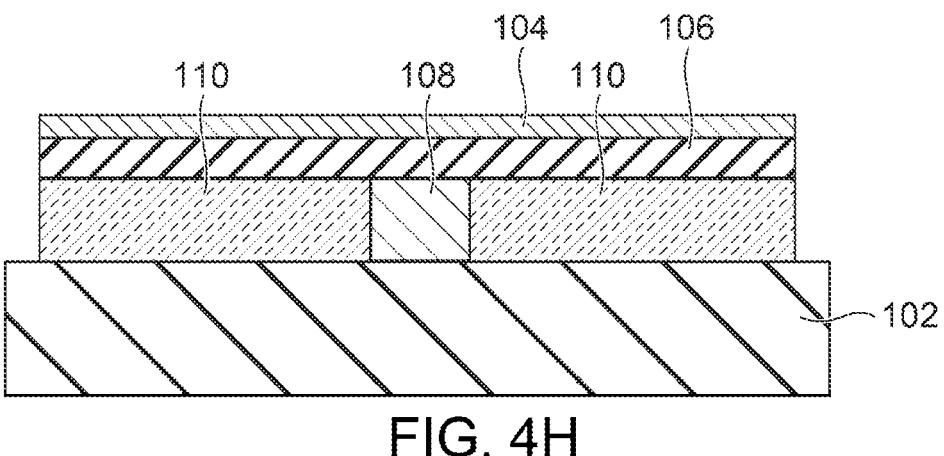
FIG. 4H is a schematic cross-sectional view of one process of the method for fabricating the sensor element of the first embodiment.

After formation of the low thermal conductive insulating films 110, a resist is applied, and a resist pattern 125 with regions of the absorber 104 and the high thermal conductive insulating film 106 opened is formed by the photolithography process. Then, as shown in FIG. 4G, an insulating film 126 made of a material of the high thermal conductive insulating film 106 is formed by, for example, the sputtering method, and a metal film 124 made of a material of the absorber 104 is formed on the insulating film 126 by, for example, the sputtering method. Next, as shown in FIG. 4H, the insulating film 126 and the metal film 124 on the resist pattern 125 are lifted off together with the resist pattern 125 to obtain the high thermal conductive insulating film 106 and the absorber 104. Accordingly, the sensor element 10 of the first embodiment is obtained.

The width wa and length la of the absorber 104, the width whi and length lhi of the high thermal conductive insulating film 106, and the length 1 of the thermoelectric conversion element 108 are preferably 10 μm to 1000 μm, but they are not restrictive. The thickness ta of the absorber 104 is preferably 2 nm to 1000 nm, and the thickness thi of the high thermal conductive insulating film 106 is preferably 5 nm to 100 nm, but they are not restrictive. In addition, the width w of the thermoelectric conversion element 108 is preferably 0.1 μm to 200 μm, and the thickness t of the thermoelectric conversion element 108 is preferably 10 nm to 10 μm, but they are not restrictive. These sizes can be arbitrarily designed depending on the intended use or other factors.

Next, the performance of the sensor element 10 will be examined when the sensor element 10 whose size and materials are defined in Table 1 is fabricated by the first fabrication method.

TABLE 1

|  | Width | Thickness | Length | Material |
|---|---|---|---|---|
| Absorber | wa = 100 μm | ta = 5 nm | la = 100 μm | NiCr |
| High thermal conductive insulating film | whi = 100 μm | thi = 10 nm | lhi = 100 μm | AlN |
| Thermoelectric conversion element | w = 5 μm | t = 200 nm | l = 100 μm | $Fe_3Ga$ |
| Low thermal conductive insulating film | wid = 47.5 μm | tid = 200 nm | lid = 100 μm | Amorphous $SiO_2$ |
| Substrate | — | ts = 500 μm | — | AlN |

Table 2 shows the thermal conductivity $\kappa_{ANE}$, area $A_{ANE}$, Nernst coefficient $S_{ANE}$, and electrical resistivity $\rho$ of the $Fe_3Ga$ thin film as the thermoelectric conversion element 108.

TABLE 2

| Material | $Fe_3Ga$ |
|---|---|
| $\kappa_{ANE}$ [W/mK] | 18 |
| $A_{ANE}$ [$m^2$] | 100 μm × 5 μm |
| $S_{ANE}$ [μV/K] | 3 |
| $\rho$ [μΩcm] | 200 |

In this case, from Equations (2) and (4), the V/Q and NEP of a single sensor element 10 are calculated as follows, and can be said to be practical numerical values depending on how the sensor element 10 is used.

$$V/Q = 16 \text{ mV/W},$$

$$NEP = 112 \text{ nW/}\sqrt{Hz}$$

The method for fabricating the sensor element 10 is not limited to the first fabrication method described above. For example, a fabrication method including annealing and etching processes (hereinafter referred to as a "second fabrication method") may be employed.

The second fabrication method for fabricating the sensor element 10 will be described with reference to FIGS. 5A to 5C.

First, the substrate 102 is annealed in a high vacuum chamber. Then, as shown in FIG. 5A, a metal film 138 made of a material exhibiting the transverse thermoelectric effect is formed by, for example, the sputtering method. After that, post annealing is performed in the same chamber.

Figure 5A:
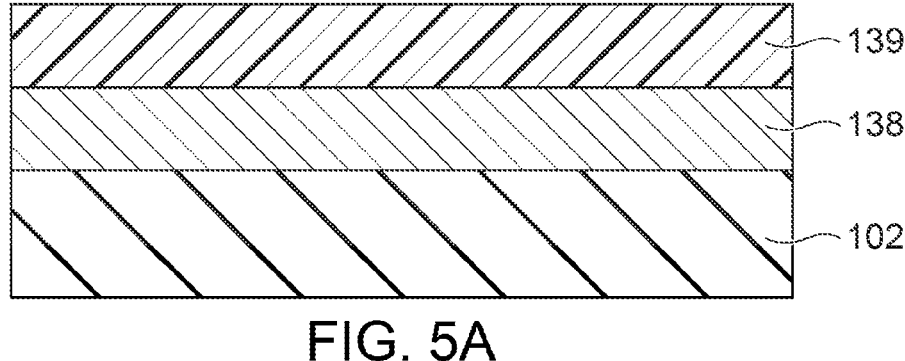
FIG. 5A is a schematic cross-sectional view of one process of another method for fabricating the sensor element of the first embodiment.
Figure 5B:
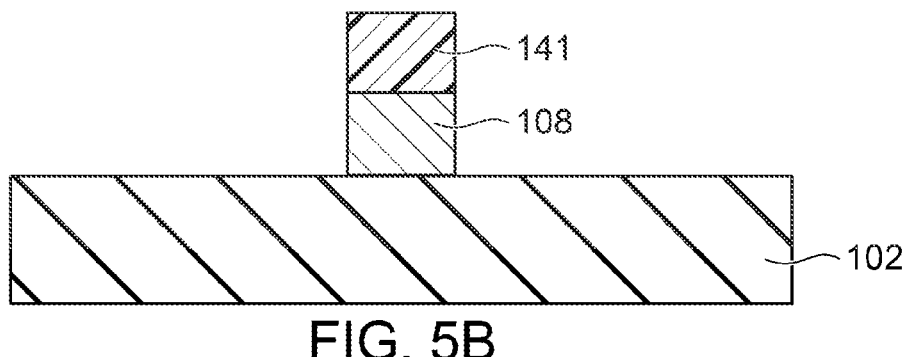
FIG. 5B is a schematic cross-sectional view of one process of another method for fabricating the sensor element of the first embodiment.
Figure 5C:
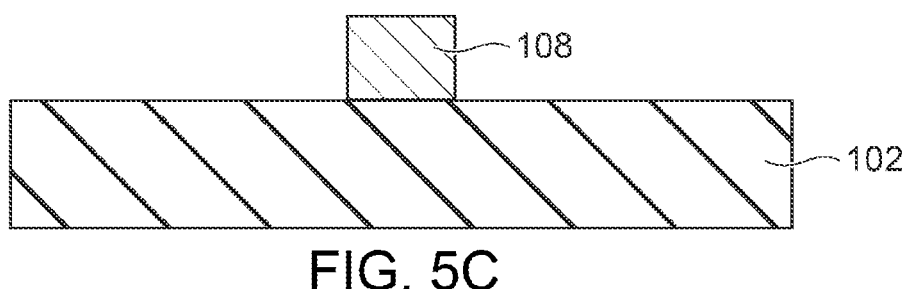
FIG. 5C is a schematic cross-sectional view of one process of another method for fabricating the sensor element of the first embodiment.

Next, as shown in FIG. 5A, a resist 139 is applied onto the metal film 138, and a resist pattern 141 is formed in a region of the thermoelectric conversion element 108 by a photolithography process. Then, as shown in FIG. 5B, the metal film 138 is dry-etched by using the resist pattern 141 as a mask. After that, as shown in FIG. 5C, the resist pattern 141 is removed by ashing to obtain the thermoelectric conversion element 108.

The process after formation of the thermoelectric conversion element 108 is the same as that shown in FIGS. 4C to 4H, and thus the description thereof will be omitted.

For example, to deposit the $Fe_3Ga$ thin film by the second fabrication method, first, the substrate 102 made of MgO (001) is annealed at 800° ° C. for 10 minutes in a high vacuum ($<10^{-5}$ Pa) chamber. Next, the $Fe_3Ga$ thin film is formed at room temperature by DC magnetron sputtering. Here, the deposition can be performed with a base vacuum of $10^{-4}$ Pa or less under the deposition pressure range of 0.1 Pa to 1.5 Pa in the chamber. For example, the base vacuum may be $5\times10^{-7}$ Pa, and the deposition pressure may be 0.5 Pa. Next, post annealing is performed at 500° ° C. for 30 minutes in the same chamber. Accordingly, the Fe₃Ga thin film with a DO₃ structure can be obtained.

Next, the performance of the sensor element 10 having the Fe₃Ga thin film with the DO₃ structure as the thermoelectric conversion element 108 will be examined.

Table 3 shows the thermal conductivity $\kappa_{ANE}$, area $A_{ANE}$, Nernst coefficient $S_{ANE}$, and electrical resistivity $\rho$ of the Fe₃Ga thin film with the DOS structure. Here, the materials and size of the sensor element 10 are the same as those defined in Table 1 except that the material of the substrate 102 is MgO.

TABLE 3

| Material | DO₃-Fe₃Ga |
|---|---|
| $\kappa_{ANE}$ [W/mK] | 18 |
| $A_{ANE}$ [m²] | 100 μm × 5 μm |
| $S_{ANE}$ [μV/K] | 5.5 |
| $\rho$ [μΩcm] | 150 |

As shown in Table 3, the Fe₃Ga thin film with the DO₃ structure has the higher Nernst coefficient $S_{ANE}$ and the lower electrical resistivity $\rho$ than the Fe₃Ga thin film shown in Table 2. In this case, from Equations (2) and (4), the V/Q and NEP of a single sensor element 10 are calculated as follows, indicating that the sensitivity is higher than the sensor element 10 fabricated by the first fabrication method which does not include an annealing process, and that the noise immunity is improved.

$$V/Q = 30 \text{ mV/W,}$$

$$NEP = 47 \text{ nW/}\sqrt{\text{Hz}}$$

For example, to deposit a Co₂MnGa thin film by the second fabrication method, the substrate 102 made of MgO (001) is annealed at 800° ° C. for 10 minutes in a high vacuum (<$10^{-5}$ Pa) chamber. Next, the Co₂MnGa thin film is formed at room temperature by DC magnetron sputtering. Also in this case, the deposition can be performed with a base vacuum of $10^{-4}$ Pa or less under the deposition pressure range of 0.1 Pa to 1.5 Pa in the chamber. For example, the base vacuum may be $1\times10^{-6}$ Pa, and the deposition pressure may be 1.2 Pa. Next, post annealing is performed at 550° C. for 60 minutes in the same chamber. Accordingly, the Co₂MnGa thin film with an L2₁ structure can be obtained.

Next, the performance of the sensor element 10 having the Co₂MnGa thin film with the L2₁ structure as the thermoelectric conversion element 108 will be examined.

Table 4 shows the thermal conductivity $\kappa_{ANE}$, area $A_{ANE}$, Nernst coefficient $S_{ANE}$, and electrical resistivity $\rho$ of the Co₂MnGa thin film with the L2₁ structure. Here, the materials and size of the sensor element 10 are the same as those defined in Table 1 except for the material of the substrate 102 (MgO) and the material of the thermoelectric conversion element 108.

TABLE 4

| Material | L2₁-Co₂MnGa |
|---|---|
| $\kappa_{ANE}$ [W/mK] | 20 |
| $A_{ANE}$ [m²] | 100 μm × 5 μm |
| $S_{ANE}$ [μV/K] | 6 |
| $\rho$ [μΩcm] | 120 |

In this case, from Equations (2) and (4), the V/Q and NEP of a single sensor element 10 are calculated as follows, indicating that the sensitivity and noise immunity are almost equivalent to those of the sensor element 10 including the Fe₃Ga thin film with the above-mentioned DO₃ structure.

$$V/Q = 30 \text{ mV/W,}$$

$$NEP = 46 \text{ nW/}\sqrt{\text{Hz}}$$

Thus, by employing the second fabrication method including the post annealing process and enhancing crystallizability of the thermoelectric conversion element 108, it is possible to increase the sensitivity of the sensor element 10 and improve the noise immunity.

Figure 6:
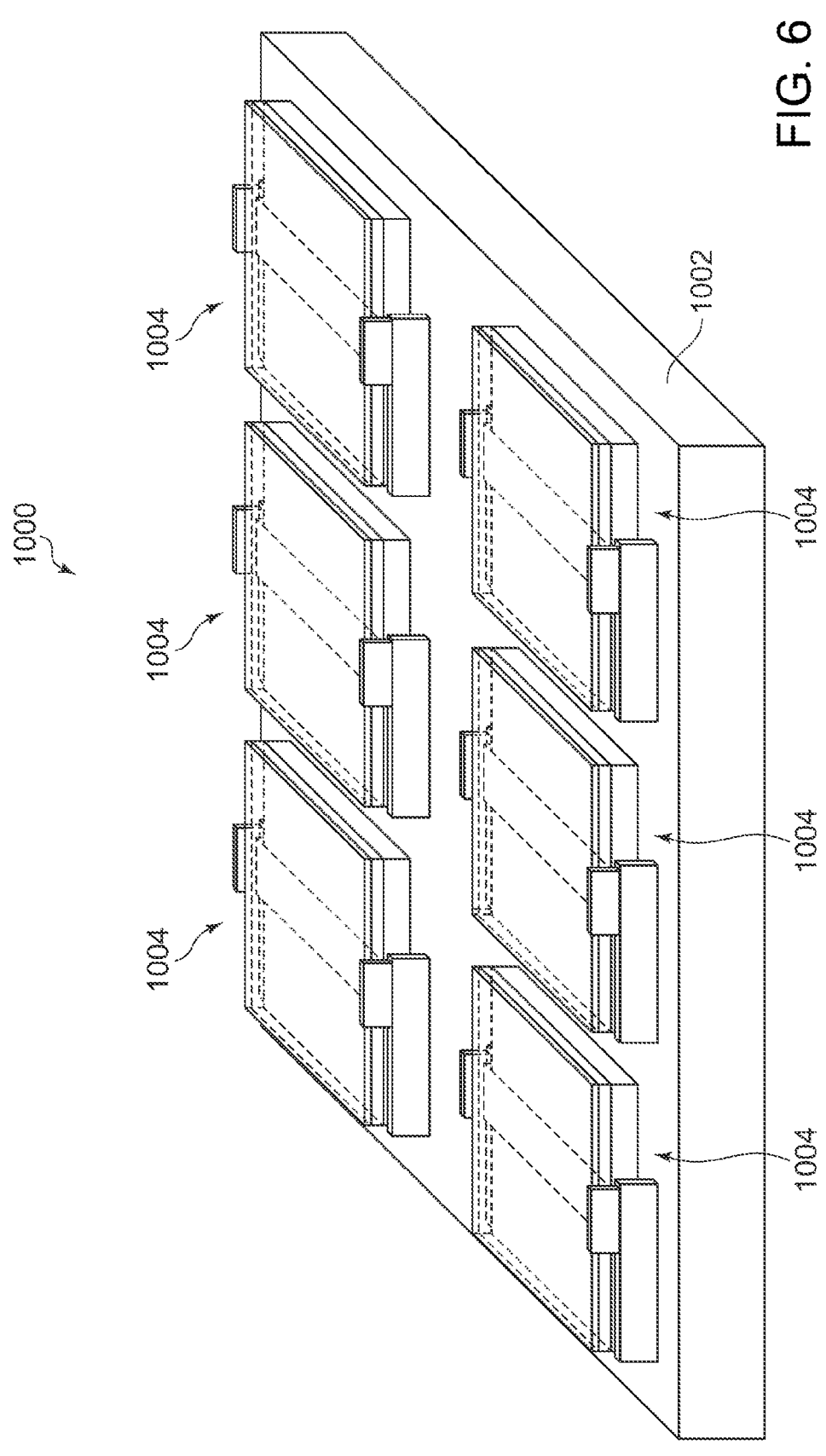
FIG. 6 is a schematic perspective view of a configuration of a sensor device including a plurality of sensor structures of the first embodiment arranged on a substrate.

Various sensor devices can be provided that include the sensor structure 1004 shown in FIG. 1. For example, a sensor device 1000 shown in FIG. 6 is a sensor array in which a plurality of sensor structures 1004 are arranged in a matrix on a substrate 1002, and can be served as an imaging device using each sensor structure 1004 as a pixel.

Second Embodiment

Next, a second embodiment of the invention will be described with reference to FIGS. 7 to 11.

Figure 7:
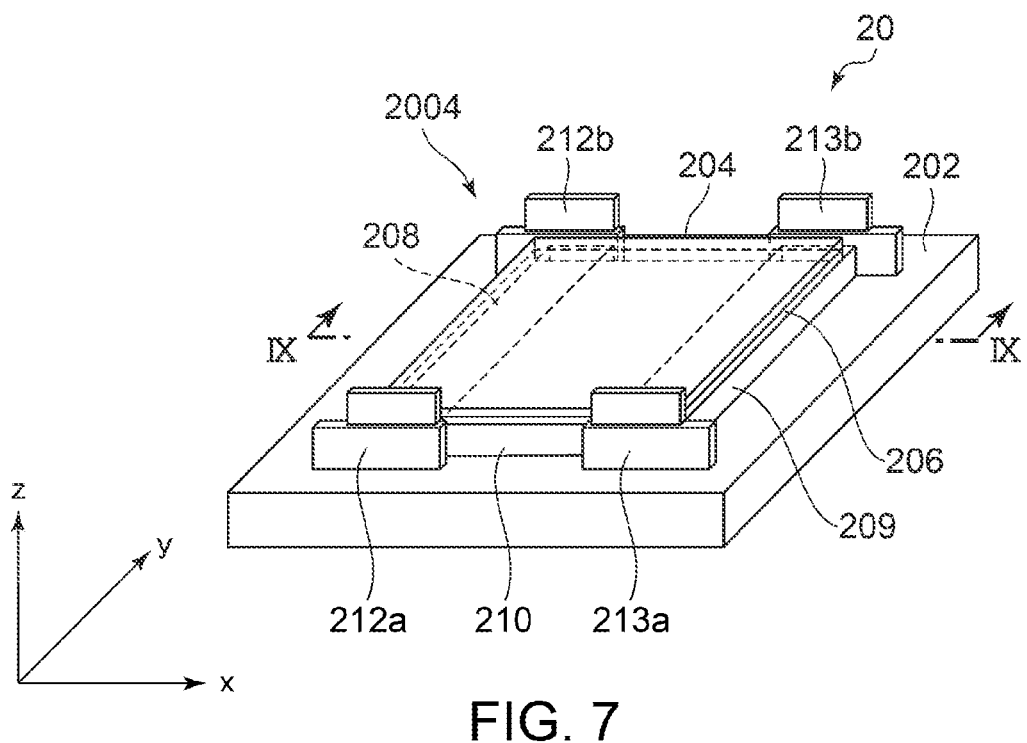
FIG. 7 is a schematic perspective view of a configuration of a sensor element of a second embodiment.
Figure 8:
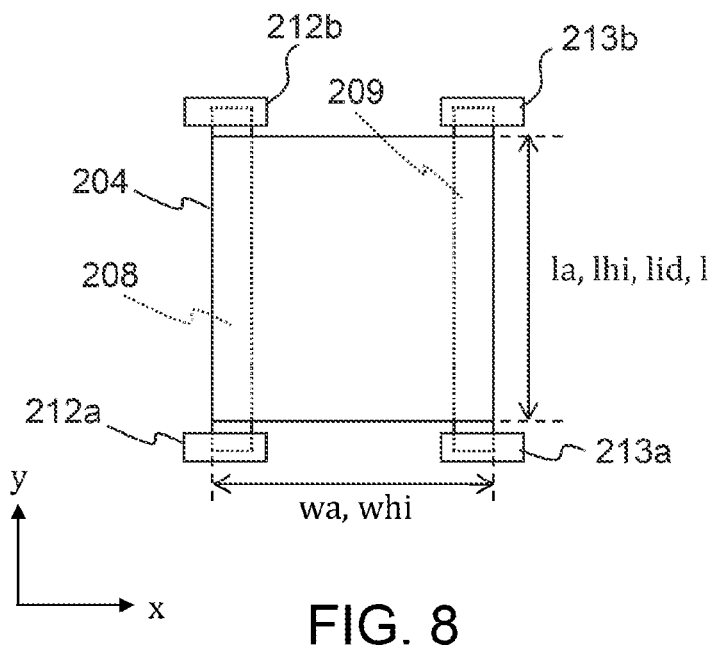
FIG. 8 is a plan view of a sensor structure shown in FIG. 7.

FIG. 7 shows a perspective view of a sensor element 20 of the second embodiment. The sensor element 20 is an element for detecting electromagnetic waves, and includes a substrate 202 and a sensor structure 2004 disposed on the substrate 202, as shown in FIG. 7. FIG. 8 shows a plan view of the sensor structure 2004, and FIG. 9 shows a cross-sectional view of FIG. 7 taken along the line IX-IX.

The sensor structure 2004 includes a first thermoelectric conversion element 208 and a second thermoelectric conversion element 209 that have a rectangular cuboid shape and are located separately from each other on the substrate 202, a low thermal conductive insulating film 210 as an interlayer dielectric film, a pair of electrodes 212a and 212b disposed at both ends of the first thermoelectric conversion element 208 in the longitudinal direction (y-direction), a pair of electrodes 213a and 213b disposed at both ends of the second thermoelectric conversion element 209 in the longitudinal direction (y-direction), a high thermal conductive insulating film 206 disposed to cover the first thermoelectric conversion element 208, the second thermoelectric conversion element 209 and the low thermal conductive insulating film 210, and an absorber 204 disposed on the high thermal conductive insulating film 206.

Figure 9:
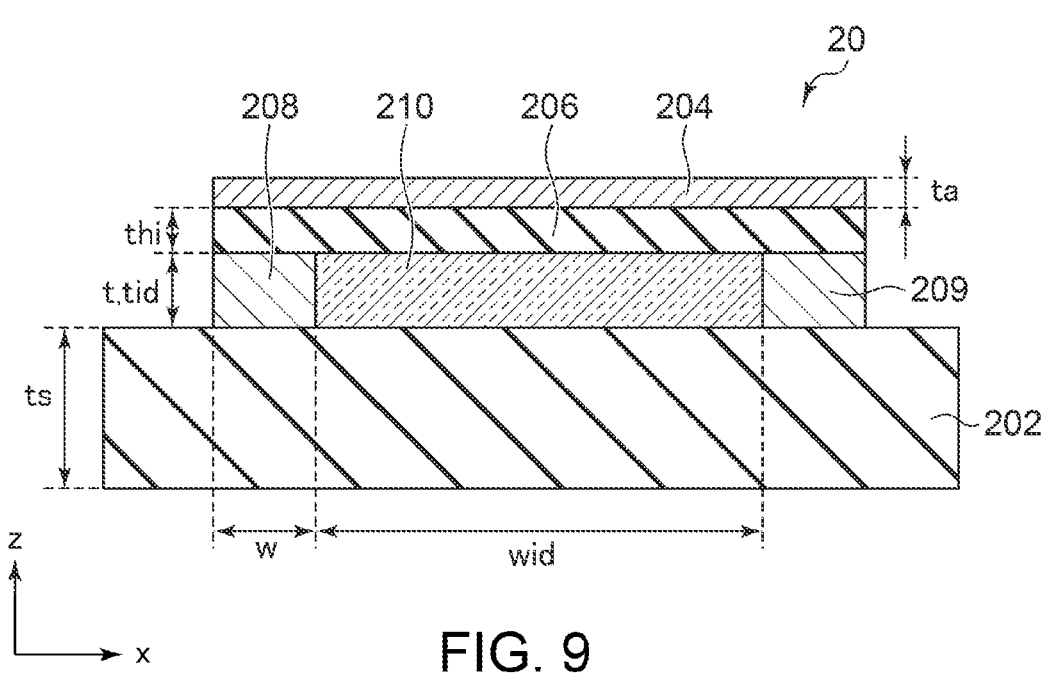
FIG. 9 is a cross-sectional view of FIG. 7 along the line IX-IX.

As shown in FIGS. 8 and 9, the first thermoelectric conversion element 208 and the second thermoelectric conversion element 209 have the same shape and the same size, and are separated in the direction (x-direction) perpendicular to the longitudinal direction (y-direction) to be arranged parallel to each other.

The low thermal conductive insulating film 210 is disposed between the substrate 202 and the high thermal conductive insulating film 206 in a region where the first thermoelectric conversion element 208 and the second thermoelectric conversion element 209 are not located. In FIGS. 7 to 9, the first thermoelectric conversion element 208 and the second thermoelectric conversion element 209 support both ends of the absorber 204 and the high thermal conductive insulating film 206 in the width direction (x-direction), but this arrangement is not restrictive. The first thermoelectric conversion element 208 and the second thermoelectric conversion element 209 may be arranged at any position as long as these elements are separately located symmetrically about a center of the absorber 204 and the high thermal conductive insulating film 206 in the width direction. Therefore, the first thermoelectric conversion element 208 and the second thermoelectric conversion element 209 may be located closer to the center. In this case, the low thermal conductive insulating film 210 can be located not only between the first thermoelectric conversion element 208 and the second thermoelectric conversion element 209, but also outside the first thermoelectric conversion element 208 (−x side) and outside the second thermoelectric conversion element 209 (+x side).

As shown in FIGS. 7 and 8, the electrodes 212a and 212b cover both ends of the first thermoelectric conversion element 208, and the electrodes 213a and 213b cover both ends of the second thermoelectric conversion element 209. As shown in FIG. 8, the electrodes 212a, 212b, 213a, and 213b are located separately from the absorber 204, the high thermal conductive insulating film 206, and the low thermal conductive insulating film 210.

Since the material and function of each component of the sensor element 20 are the same as those of the corresponding components of the sensor element 10 of the first embodiment, and since the shape and sizes of the absorber 204, the high thermal conductive insulating film 206, the first thermoelectric conversion element 208, and the second thermoelectric conversion element 209 are also the same as those of the corresponding components of the sensor element 10 of the first embodiment, the description thereof will be omitted.

Next, a method for fabricating the sensor element 20 of the second embodiment (hereinafter referred to as a "third fabrication method") will be described with reference to FIGS. 10A to 10I.

Figure 10A:
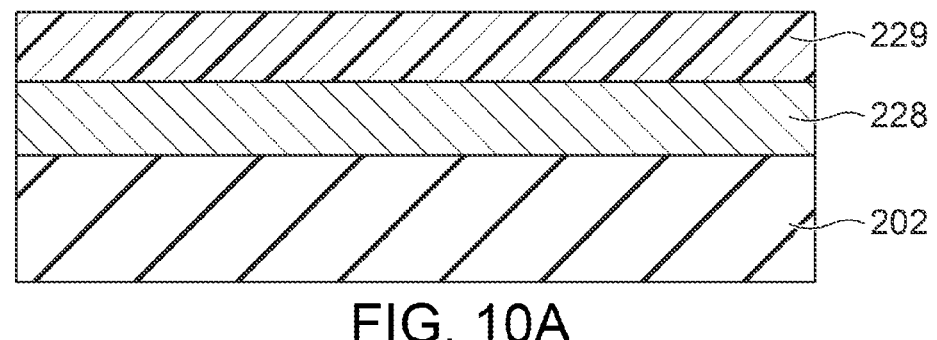
FIG. 10A is a schematic cross-sectional view of one process of a method for fabricating the sensor element of the second embodiment.

First, the substrate 202 is annealed in a high vacuum chamber. Then, as shown in FIG. 10A, a metal film 228 made of a material exhibiting the transverse thermoelectric effect is formed by, for example, sputtering method. After that, post annealing is performed in the same chamber. For example, to deposit the $Fe_3Ga$ thin film or the $Co_2MnGa$ thin film on the substrate 202 made of MgO (001), the above-described deposition conditions (such as vacuum, pressure, temperature, annealing time) in the second fabrication method of the first embodiment can be employed.

Figure 10B:
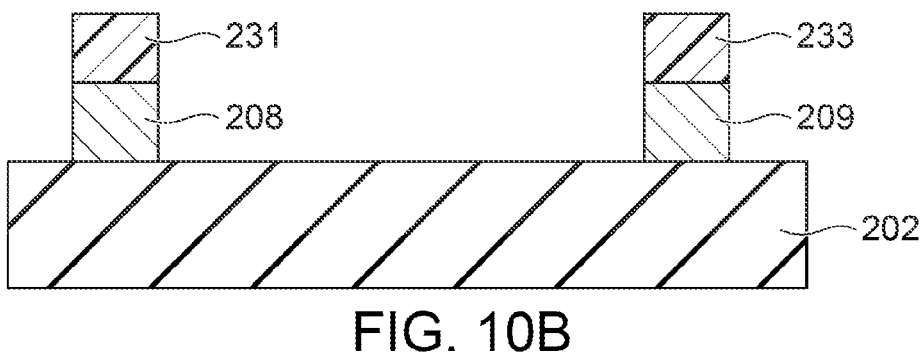
FIG. 10B is a schematic cross-sectional view of one process of the method for fabricating the sensor element of the second embodiment.
Figure 10C:
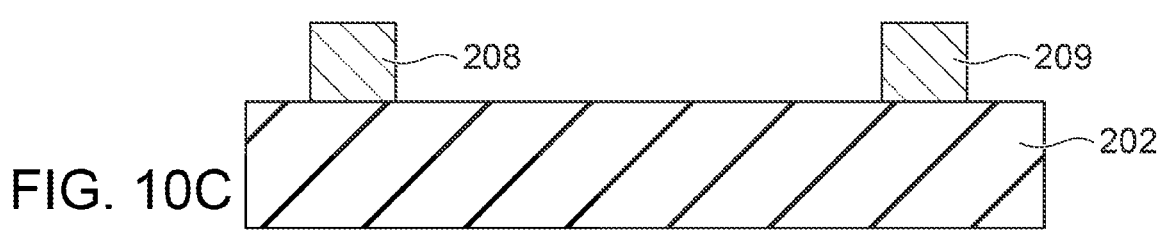
FIG. 10C is a schematic cross-sectional view of one process of the method for fabricating the sensor element of the second embodiment.

Next, as shown in FIG. 10A, a resist 229 is applied onto the metal film 228, and resist patterns 231 and 233 are formed by a photolithography process in regions of the first thermoelectric conversion element 208 and the second thermoelectric conversion element 209. Then, as shown in FIG. 10B, the metal film 228 is dry-etched by using the resist patterns 231 and 233 as masks. After that, as shown in FIG. 10C, the resist patterns 231 and 233 are removed by ashing to obtain the first thermoelectric conversion element 208 and the second thermoelectric conversion element 209.

Figure 10D:
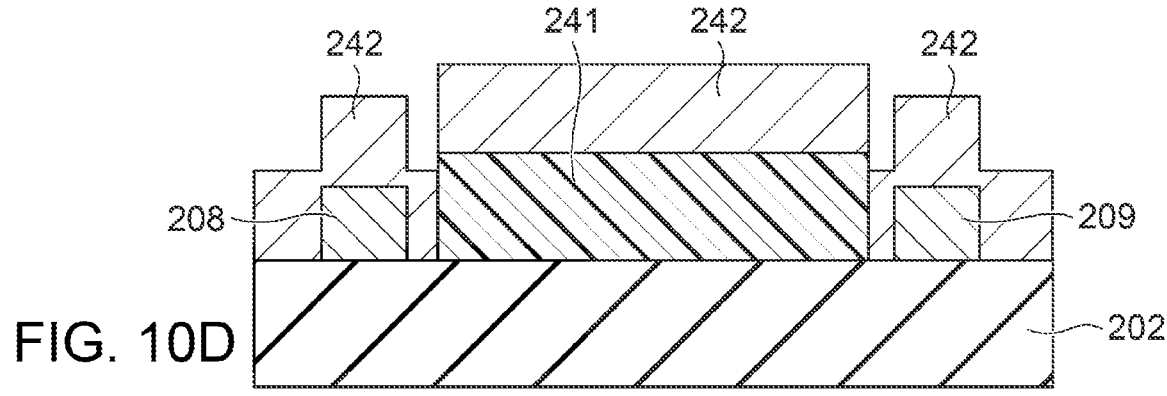
FIG. 10D is a schematic cross-sectional view of one process of the method for fabricating the sensor element of the second embodiment.

After formation of the first thermoelectric conversion element 208 and the second thermoelectric conversion element 209, a resist is applied, and a resist pattern 241 with regions of the electrodes 212a, 212b, 213a, and 213b opened is formed by the photolithography process. Then, as shown in FIG. 10D, a metal film 242 made of the electrode material is formed by, for example, EB deposition.

Figure 10E:
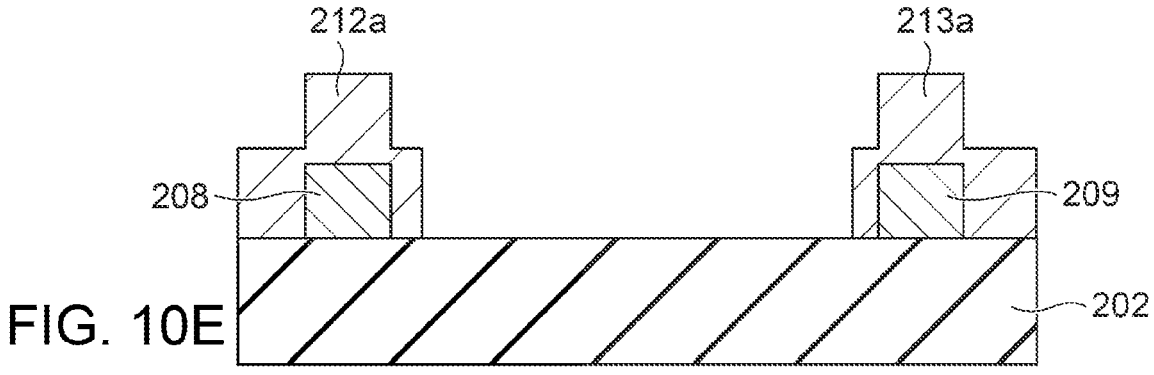
FIG. 10E is a schematic cross-sectional view of one process of the method for fabricating the sensor element of the second embodiment.

Next, as shown in FIG. 10E, the metal film 242 on the resist pattern 241 is lifted off together with the resist pattern 241 to obtain the electrodes 212a, 212b, 213a, and 213b.

Figure 10F:
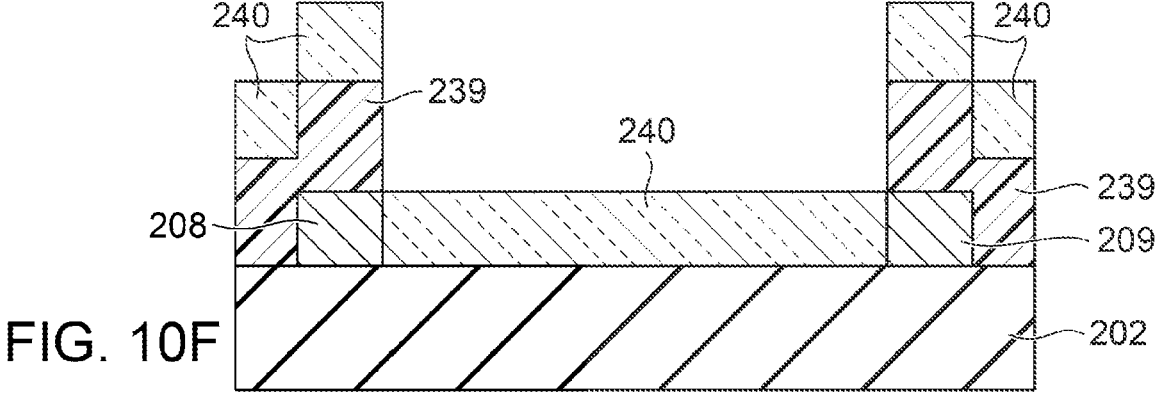
FIG. 10F is a schematic cross-sectional view of one process of the method for fabricating the sensor element of the second embodiment.

After formation of the electrodes 212a, 212b, 213a, and 213b, a resist is applied, and a resist pattern 239 with regions of the low thermal conductive insulating film 210 opened is formed by the photolithography process. Then, as shown in FIG. 10F, an insulating film 240 made of a material of the low thermal conductive insulating film 210 is formed with the same thickness as those of the first thermoelectric conversion element 208 and the second thermoelectric conversion element 209 by, for example, the sputtering method.

Figure 10G:
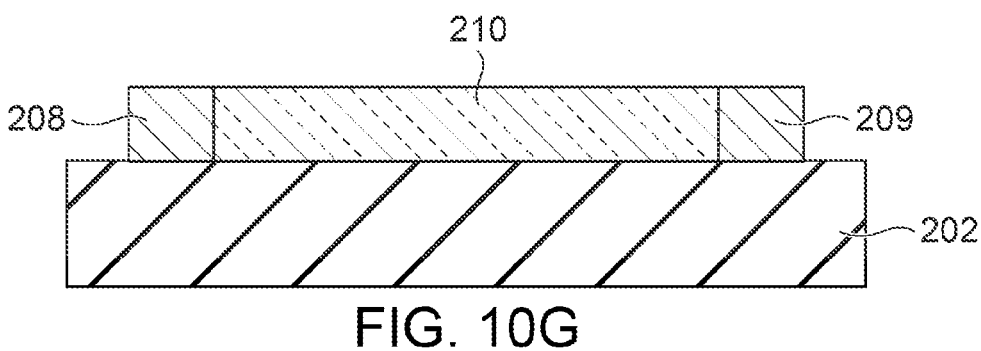
FIG. 10G is a schematic cross-sectional view of one process of the method for fabricating the sensor element of the second embodiment.

Next, as shown in FIG. 10G, the insulating film 240 on the resist pattern 239 is lifted off together with the resist pattern 239 to obtain the low thermal conductive insulating film 210. It is noted that the low thermal conductive insulating film 210 may be formed by a spin-on-glass method instead of the sputtering method.

Figure 10H:
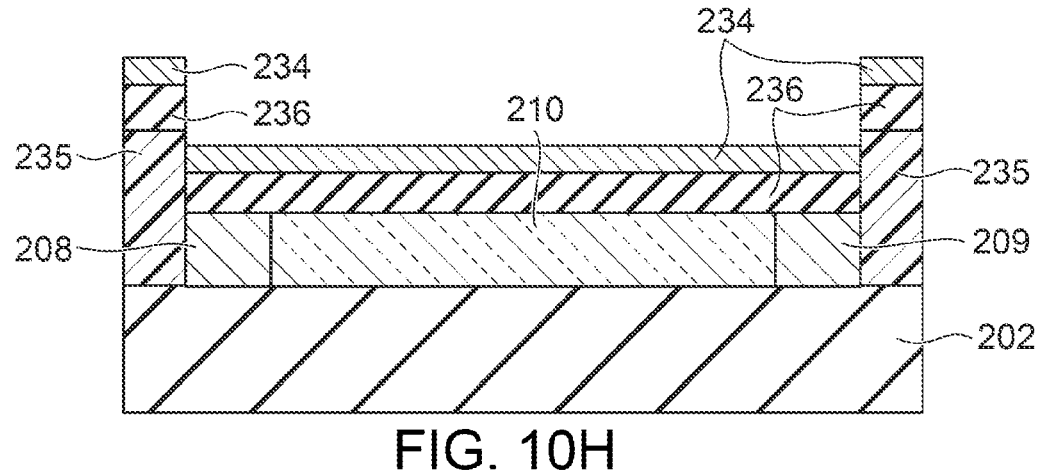
FIG. 10H is a schematic cross-sectional view of one process of the method for fabricating the sensor element of the second embodiment.

After formation of the low thermal conductive insulating film 210, a resist is applied, and a resist pattern 235 with regions of the absorber 204 and the high thermal conductive insulating film 206 opened is formed by the photolithography process. Then, as shown in FIG. 10H, an insulating film 236 made of a material of the high thermal conductive insulating film 206 is formed by, for example, the sputtering method, and a metal film 234 made of a material of the absorber 204 is formed on the insulating film 236 by, for example, the sputtering method.

Figure 10I:
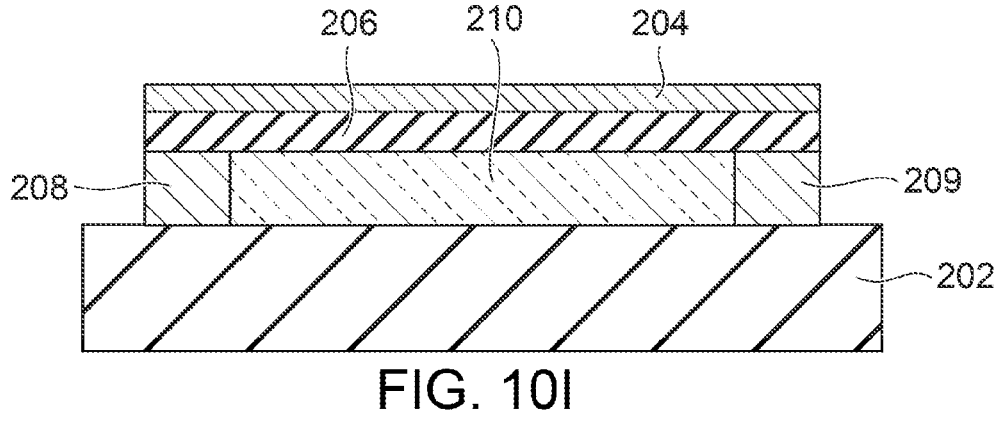
FIG. 10I is a schematic cross-sectional view of one process of the method for fabricating the sensor element of the second embodiment.

Finally, as shown in FIG. 10I, the insulating film 236 and the metal film 234 on the resist pattern 235 are lifted off together with the resist pattern 235 to obtain the high thermal conductive insulating film 206 and the absorber 204. Accordingly, the sensor element 20 of the second embodiment is obtained.

Next, the performance of the sensor element 20 will be examined when the sensor element 20 whose size and materials are defined in Table 5 is fabricated by the third fabrication method.

TABLE 5

|  | Width | Thickness | Length | Material |
|---|---|---|---|---|
| Absorber | wa = 100 μm | ta = 5 nm | la = 100 μm | NiCr |
| High thermal conductive insulating film | whi = 100 μm | thi = 10 nm | lhi = 100 μm | AlN |
| Thermo-electric conversion element | w = 5 μm | t = 200 nm | l = 100 μm | $Co_2MnGa$ |
| Low thermal conductive insulating film | wid = 90 μm | tid = 200 nm | lid = 100 μm | Amorphous $SiO_2$ |
| Substrate | — | ts = 500 μm | — | MgO |

The thermal conductivity $\kappa_{ANE}$, area $A_{ANE}$, Nernst coefficient $S_{ANE}$, and electrical resistivity $\rho$ of each of the first thermoelectric conversion element 208 and the second thermoelectric conversion element 209 are the same as those defined in Table 4.

In this case, from Equations (2) and (4), the V/Q and NEP of a single sensor element 20 are calculated as follows, indicating that the sensitivity is improved as compared to the sensor element 10 of the first embodiment including the Co$_2$MnGa thin film. Here, Equations (2) and (4) include contributions from the two thermoelectric conversion elements.

$$V/Q = 41 \text{ mV/W},$$

$$NEP = 48 \text{ nW/}\sqrt{\text{Hz}}$$

Figure 11:
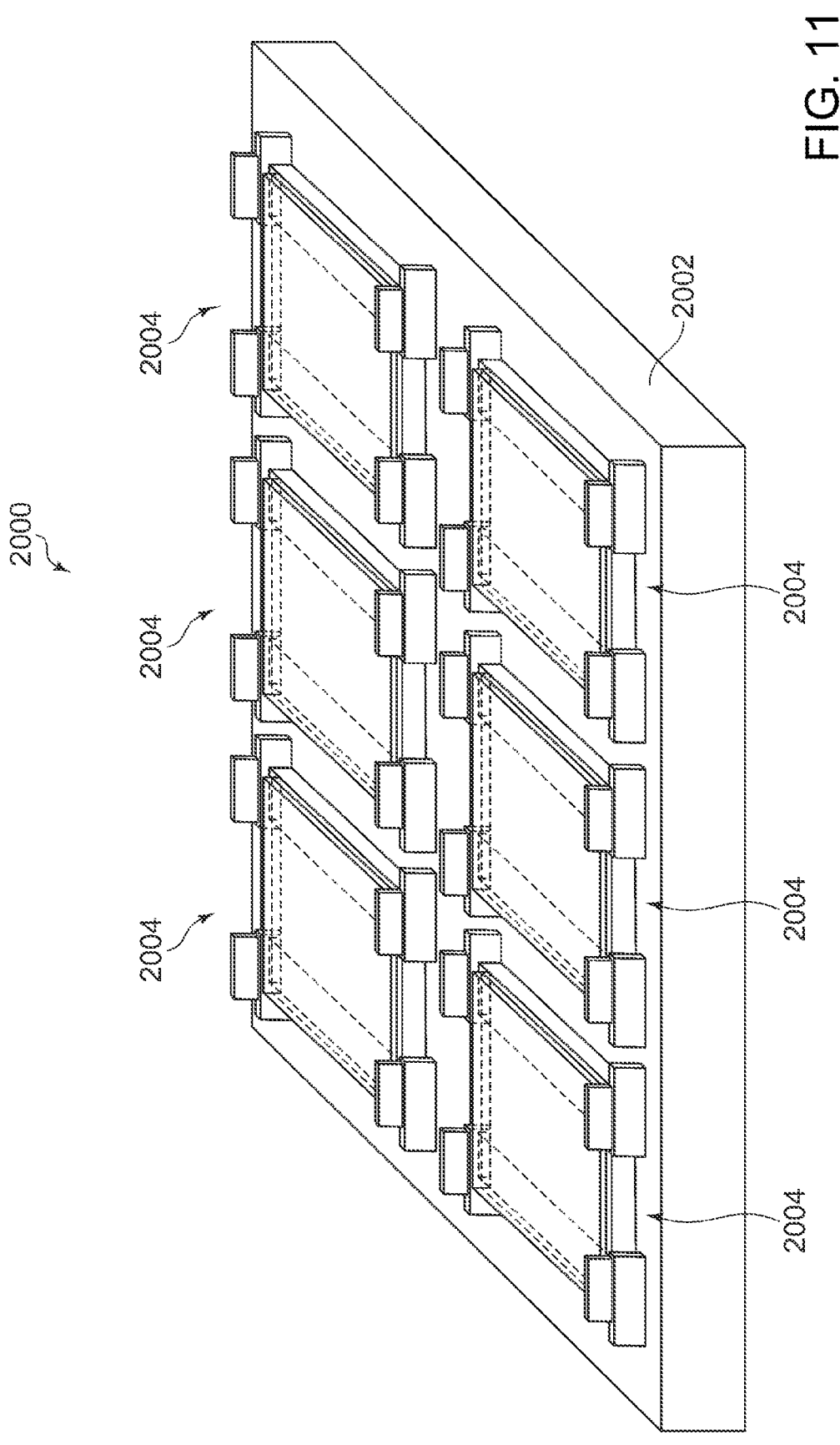
FIG. 11 is a schematic perspective view of a configuration of a sensor device including a plurality of sensor structures of the second embodiment arranged on a substrate.

Various sensor devices including the sensor structure 2004 shown in FIG. 7 can also be provided in the second embodiment. For example, a sensor device 2000 shown in FIG. 11 is a sensor array in which a plurality of sensor structures 2004 are arranged in a matrix on a substrate 2002, and can be served as an imaging device using each sensor structure 2004 as a pixel.

Third Embodiment

Next, a third embodiment of the invention will be described with reference to FIGS. 12 to 16.

Figure 12:
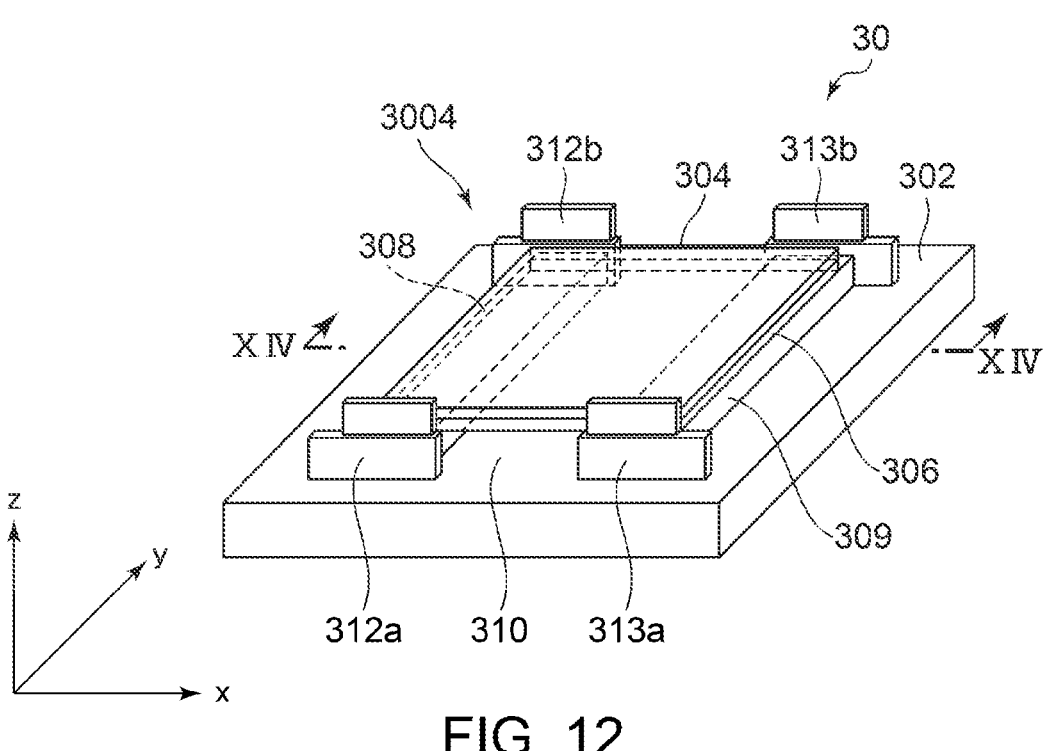
FIG. 12 is a schematic perspective view of a configuration of a sensor element of a third embodiment.
Figure 13:
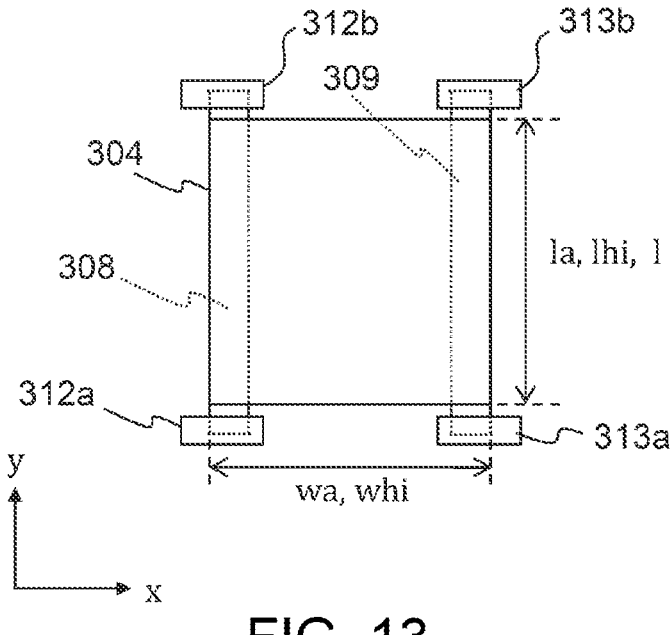
FIG. 13 is a plan view of a sensor structure shown in FIG. 12.

FIG. 12 shows a perspective view of a sensor element 30 of the third embodiment. The sensor element 30 is an element for detecting electromagnetic waves, and as shown in FIG. 12, includes a substrate 302 and a sensor structure 3004 disposed on the substrate 302. FIG. 13 shows a plan view of the sensor structure 3004, and FIG. 14 shows a cross-sectional view of FIG. 12 taken along the line XIV-XIV.

The sensor element 30 has substantially the same configuration as the sensor element 20 of the second embodiment except that the low thermal conductive insulating film 210 is removed. Specifically, the sensor structure 3004 of the sensor element 30 includes a high thermal conductive insulating film 306, an absorber 304 disposed on the high thermal conductive insulating film 306, a first thermoelectric conversion element 308 and a second thermoelectric conversion element 309 that have a rectangular cuboid shape and support both ends of the absorber 304 and the high thermal conductive insulating film 306, a pair of electrodes 312a and 312b disposed at both ends of the first thermoelectric conversion element 308 in the longitudinal direction (y-direction), and a pair of electrodes 313a and 313b disposed at both ends of the second thermoelectric conversion element 309 in the longitudinal direction (y-direction). A hollow region 310 is provided between the first thermoelectric conversion element 308 and the second thermoelectric conversion element 309 and between the high thermal conductive insulating film 306 and the substrate 302.

Figure 14:
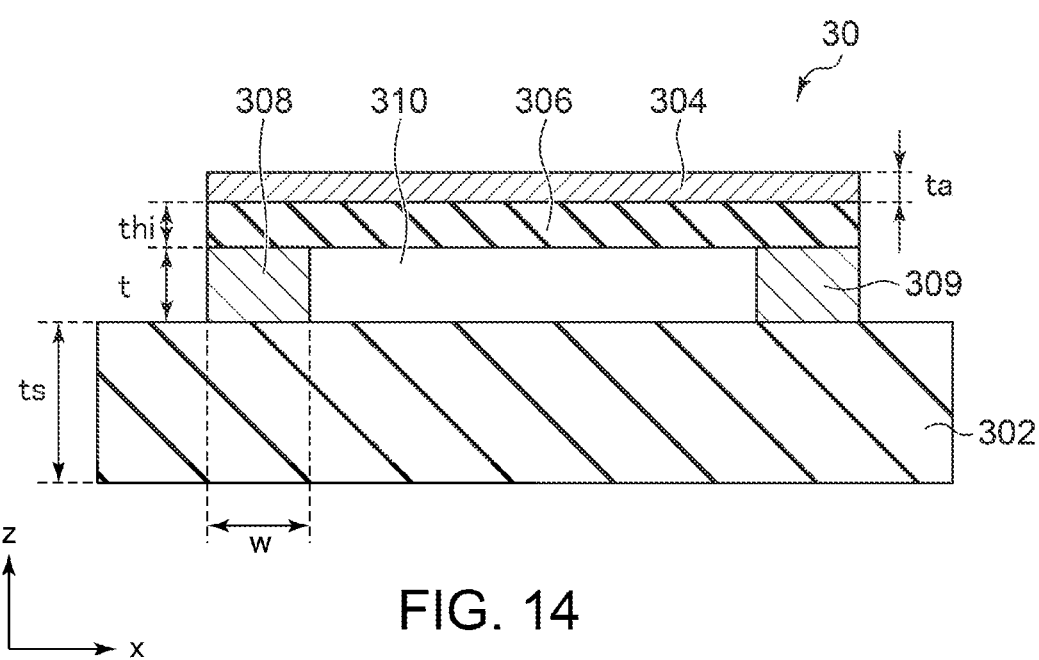
FIG. 14 is a cross-sectional view of FIG. 12 along the line XIV-XIV.

As shown in FIG. 14, the absorber 304 and the high thermal conductive insulating film 306 are supported at both ends by the first thermoelectric conversion element 308 and the second thermoelectric conversion element 309 to provide a bridge structure. The hollow region 310 is in a vacuum state after the sensor element 30 is sealed in a vacuum.

Since the shape, size, material, and function of each component of the sensor element 30 are the same as those of the corresponding components of the sensor element 20 of the second embodiment, the description thereof will be omitted.

Next, a method for fabricating the sensor element 30 of the third embodiment (hereinafter referred to as a "fourth fabrication method") will be described with reference to FIGS. 15A to 15E.

The steps of forming the first thermoelectric conversion element 308, the second thermoelectric conversion element 309, and the electrodes 312a, 312b, 313a, and 313b on the substrate 302 are the same as those shown in FIGS. 10A to 10E of the second embodiment, and thus the description thereof will be omitted.

Figure 15A:
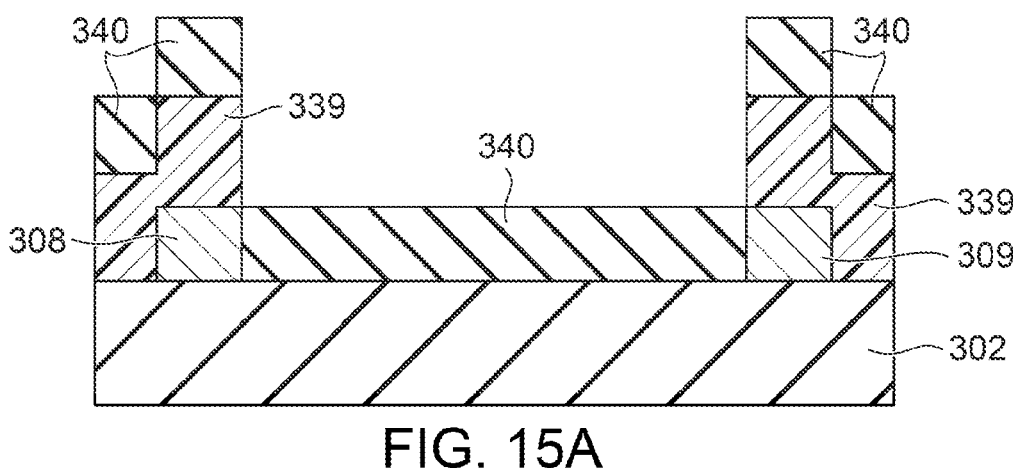
FIG. 15A is a schematic cross-sectional view of one process of a method for fabricating the sensor element of the third embodiment.

After formation of the first thermoelectric conversion element 308, the second thermoelectric conversion element 309, and the electrodes 312a, 312b, 313a, and 313b, a resist is applied, and a resist pattern 339 with areas of the hollow region 310 opened is formed by the photolithography process. Then, as shown in FIG. 15A, a deliquescent material layer 340 having the same thickness as those of the first thermoelectric conversion element 308 and the second thermoelectric conversion element 309 is formed by, for example, a vacuum deposition method or the sputtering method. The deliquescent material layer 340 is made of, for example, sodium chloride, MgO, or an organic material.

Figure 15B:
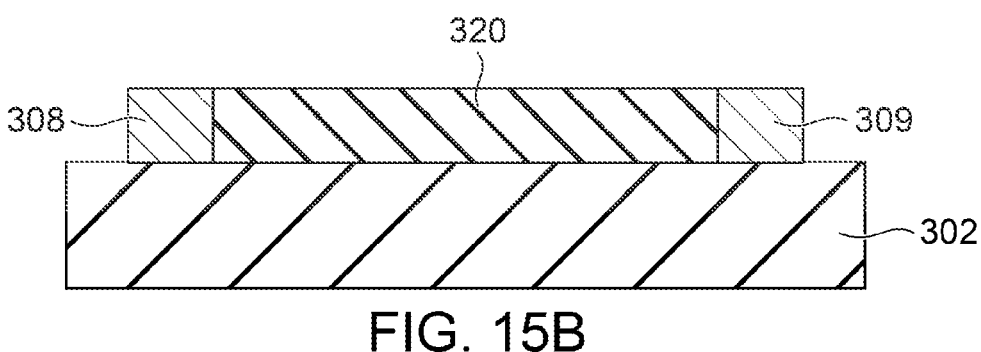
FIG. 15B is a schematic cross-sectional view of one process of the method for fabricating the sensor element of the third embodiment.

Next, as shown in FIG. 15B, the deliquescent material layer 340 on the resist pattern 339 is lifted off together with the resist pattern 339 to obtain an interpolating layer 320.

Figure 15C:
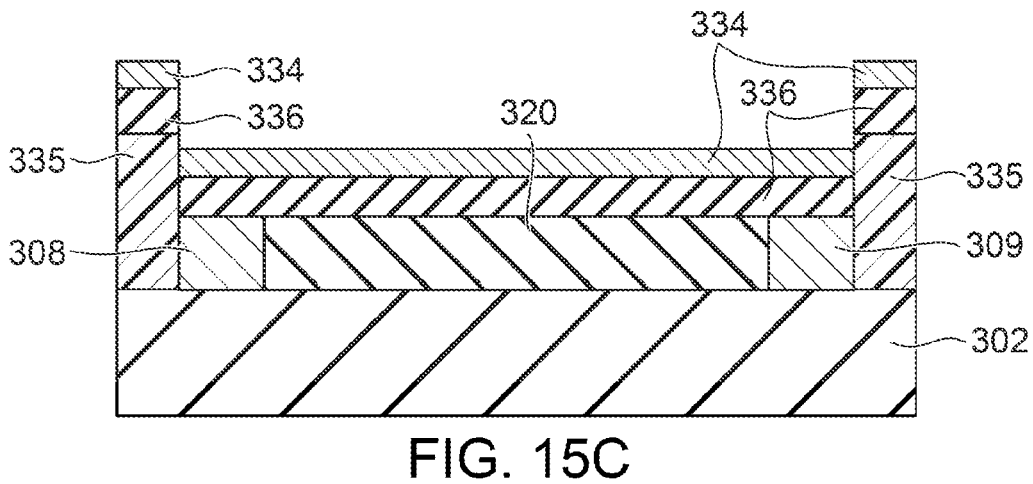
FIG. 15C is a schematic cross-sectional view of one process of the method for fabricating the sensor element of the third embodiment.

After formation of the interpolating layer 320, a resist is applied, and a resist pattern 335 with regions of the absorber 304 and the high thermal conductive insulating film 306 opened is formed by the photolithography process. Then, as shown in FIG. 15C, an insulating film 336 made of a material of the high thermal conductive insulating film 306 is formed by, for example, the sputtering method, and a metal film 334 made of a material of the absorber 304 is formed on the insulating film 336 by, for example, the sputtering method.

Figure 15D:
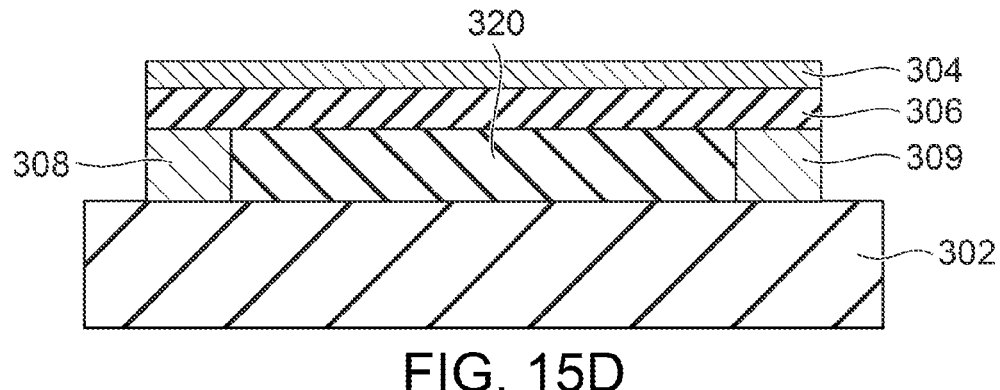
FIG. 15D is a schematic cross-sectional view of one process of the method for fabricating the sensor element of the third embodiment.

Next, as shown in FIG. 15D, the insulating film 336 and the metal film 334 on the resist pattern 335 are lifted off together with the resist pattern 335 to obtain the high thermal conductive insulating film 306 and the absorber 304.

Figure 15E:
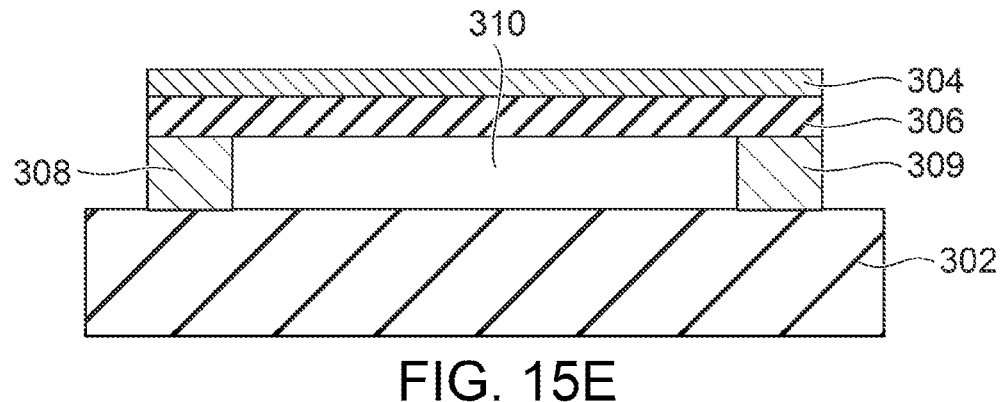
FIG. 15E is a schematic cross-sectional view of one process of the method for fabricating the sensor element of the third embodiment.

Finally, as shown in FIG. 15E, the interpolating layer 320 is dissolved with water to remove the interpolating layer 320, and thus the hollow region 310 is formed. Accordingly, the sensor element 30 of the third embodiment is obtained.

Next, the performance of the sensor element 30 will be examined when the sensor element 30 whose size and materials are defined in Table 6 is fabricated by the fourth fabrication method.

TABLE 6

|  | Width | Thickness | Length | Material |
|---|---|---|---|---|
| Absorber | wa = 100 µm | ta = 5 nm | la = 100 µm | NiCr |
| High thermal conductive insulating film | whi = 100 µm | thi = 10 nm | lhi = 100 µm | SiN |
| Thermoelectric conversion element | w = 5 µm | t = 200 nm | l = 100 µm | Co$_2$MnGa |
| Substrate | — | ts = 500 µm | — | MgO |

The thermal conductivity $\kappa_{ANE}$, area $A_{ANE}$, Nernst coefficient $S_{ANE}$, and electrical resistivity $\rho$ of each of the first thermoelectric conversion element 308 and the second thermoelectric conversion element 309 are the same as those defined in Table 4.

In this case, the V/Q and NEP of a single sensor element 30 are calculated as follows based on Equations (2) and (4). Here, Equations (2) and (4) include contributions from the two thermoelectric conversion elements.

$$V/Q = 60 \text{ mV/W},$$

$$NEP = 33 \text{ nW}/\sqrt{Hz}$$

Thus, the sensor element 30 of the third embodiment has significantly improved sensitivity and noise immunity as compared to the sensor element 10 of the first embodiment and the sensor element 20 of the second embodiment. This indicates that the heat current from the absorber 304 is concentrated on the first thermoelectric conversion element 308 and the second thermoelectric conversion element 309 by providing the vacuum hollow region 310 between the first thermoelectric conversion element 308 and the second thermoelectric conversion element 309.

Figure 16:
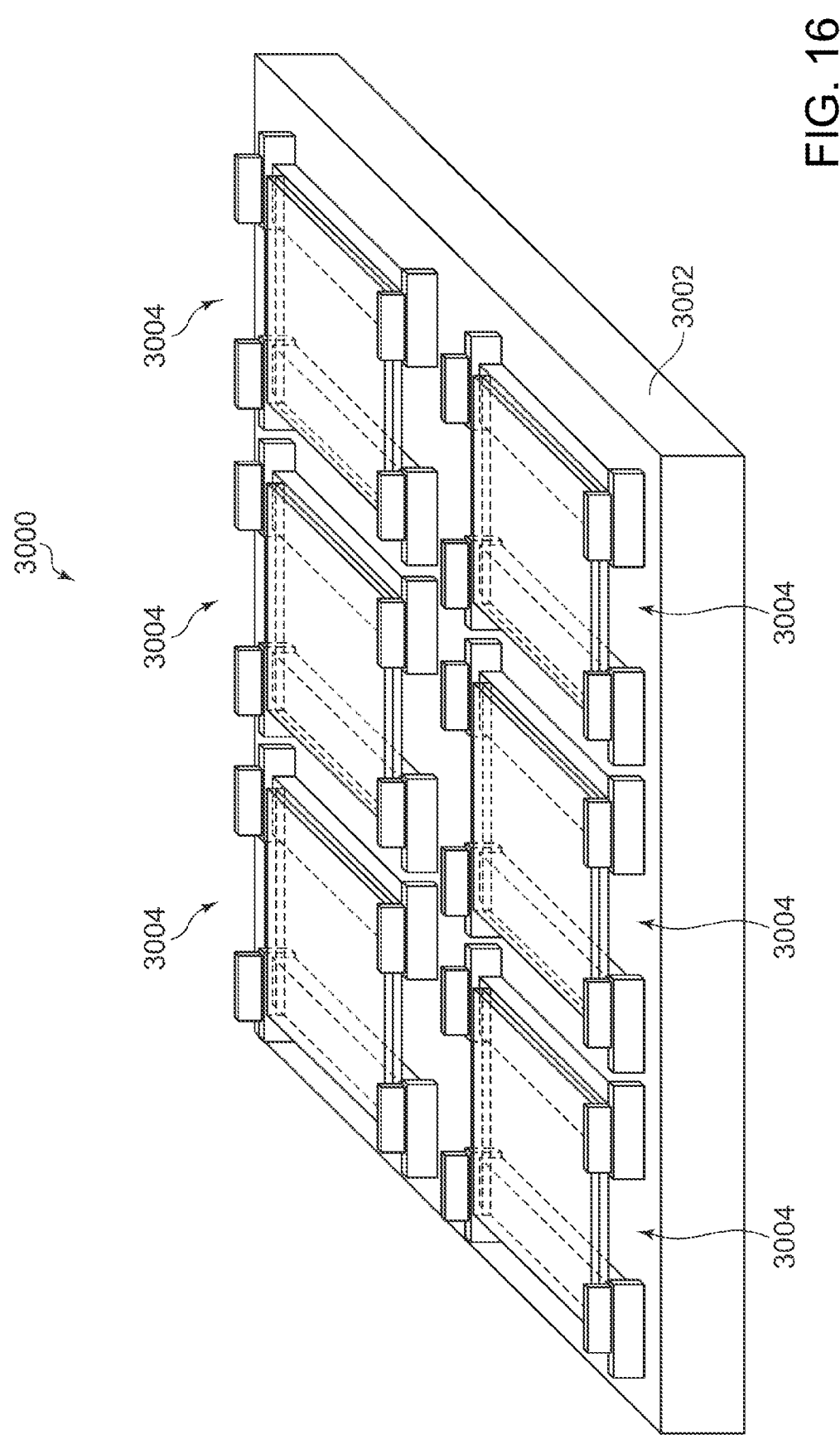
FIG. 16 is a schematic perspective view of a configuration of a sensor device including a plurality of sensor structures of the third embodiment arranged on a substrate.

Various sensor devices including the sensor structure 3004 shown in FIG. 12 can also be realized in the third embodiment. For example, a sensor device 3000 shown in FIG. 16 is a sensor array in which a plurality of sensor structures 3004 are arranged in a matrix on a substrate 3002, and can be served as an imaging device using each sensor structure 3004 as a pixel.

According to the sensor elements and sensor devices of the first to third embodiments, it is possible to realize a simply structured and large-area device. Moreover, a very inexpensive device can be fabricated without using a micro-fabrication apparatus. Furthermore, the thinner thermoelectric conversion elements allow a design with a small heat capacity and enhance a response speed. Such excellent properties allow, for example, the sensor element to be integrated into a baggage inspection device or other such devices to inspect contents of baggage at a high speed. In addition, background noise can be suppressed, and an S/N ratio can be increased. Furthermore, depending on structure and arrangement of the sensor elements, the resolution in the order of µW can be realized with a temperature width of 100 K or more.

Fourth Embodiment

Next, a fourth embodiment of the invention will be described with reference to FIG. 17.

While the thermoelectric conversion elements of the first to third embodiments are thin films, a thermoelectric conversion element of the fourth embodiment has a bulk structure.

Figure 17:
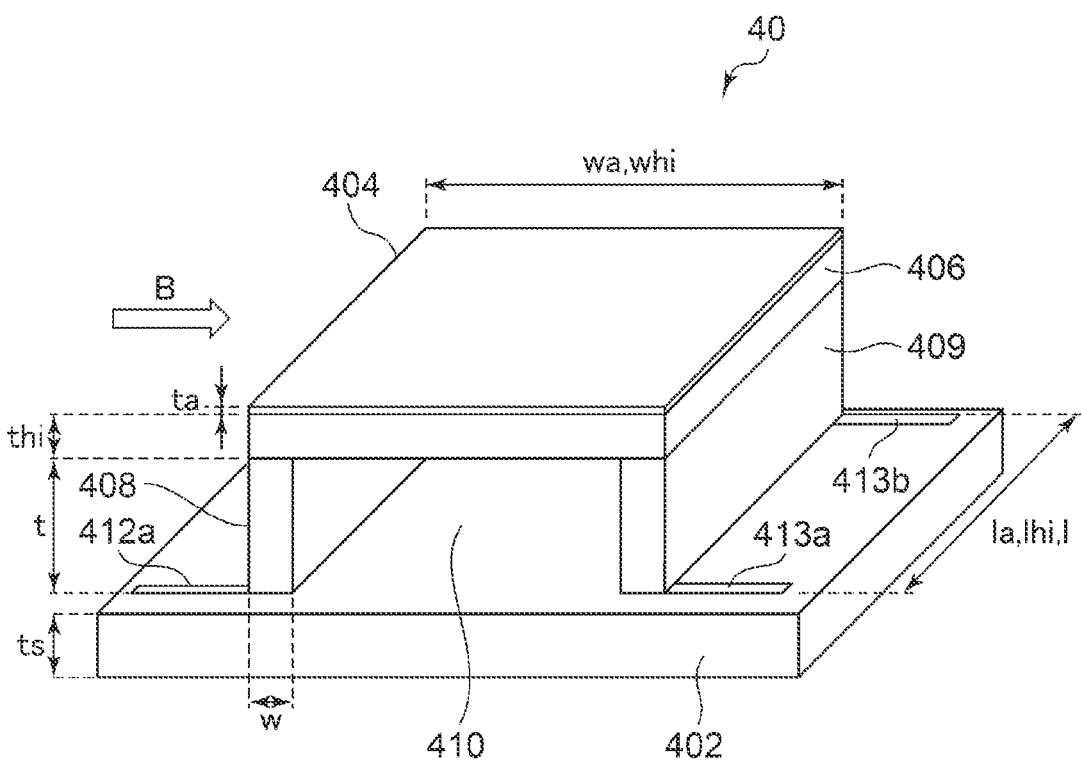
FIG. 17 is a schematic perspective view of a configuration of a sensor element of a fourth embodiment.

FIG. 17 shows a perspective view of a sensor element 40 of the fourth embodiment. The sensor element 40 is an element for detecting electromagnetic waves, and as shown in FIG. 17, includes a substrate 402, a plate-shaped high thermal conductive insulating film 406, an absorber 404 disposed on the high thermal conductive insulating film 406, a first thermoelectric conversion element 408 and a second thermoelectric conversion element 409 that have a rectangular cuboid shape and support both ends of the absorber 404 and the high thermal conductive insulating film 406 on the substrate 402, a pair of electrodes 412a and 412b (412b is not shown) disposed at both ends of the first thermoelectric conversion element 408 in the longitudinal direction, and a pair of electrodes 413a and 413b disposed at both ends of the second thermoelectric conversion element 409 in the longitudinal direction. A hollow region 410 is provided between the first thermoelectric conversion element 408 and the second thermoelectric conversion element 409 and between the high thermal conductive insulating film 406 and the substrate 402.

As shown in FIG. 17, the absorber 404 and the high thermal conductive insulating film 406 are supported at both ends by the first thermoelectric conversion element 408 and the second thermoelectric conversion element 409 to provide a bridge structure. The hollow region 410 is in a vacuum state after the sensor element 40 is sealed in a vacuum. When the sensor element 40 is used, an external magnetic field B is applied in the width direction of the first thermoelectric conversion element 408 and the second thermoelectric conversion element 409.

The sensor element 40 is obtained by arranging on the substrate 402 the first thermoelectric conversion element 408 and the second thermoelectric conversion element 409 that have a rectangular cuboid shape in parallel to be separated from each other in the width direction, and placing a structure including the thin-film absorber 404 and the thin-film high thermal conductive insulating film 406 on the first thermoelectric conversion element 408 and the second thermoelectric conversion element 409 which are served as support stands.

Next, the performance of the sensor element 40 of the fourth embodiment will be examined below on the assumption that the sensor element 40 has size and materials defined in Table 7.

TABLE 7

|  | Width | Thickness | Length | Material |
|---|---|---|---|---|
| Absorber | wa = 10 mm | ta = 5 nm | la = 10 mm | NiCr |
| High thermal conductive insulating film | whi = 10 mm | thi = 100 µm | thi = 10 mm | AlN |
| Thermoelectric conversion element | w = 0.5 mm | t = 1 mm | l = 10 mm | Co$_2$MnGa |
| Substrate | — | ts = 500 µm | — | MgO |

Table 8 shows the thermal conductivity $\kappa_{ANE}$, area $A_{ANE}$, Nernst coefficient $S_{ANE}$, and electrical resistivity $\rho$ of each of the first thermoelectric conversion element 408 and the second thermoelectric conversion element 409.

TABLE 8

| Material | Co$_2$MnGa |
|---|---|
| $\kappa_{ANE}$ [W/mK] | 20 |
| $A_{ANE}$ [m$^2$] | 10 mm × 0.5 mm |
| $S_{ANE}$ [µV/K] | 6 |
| $\rho$ [µΩcm] | 120 |

In this case, the V/Q and NEP of a single sensor element 40 are calculated as follows based on Equations (2) and (4). Here, Equations (2) and (4) include contributions from the two thermoelectric conversion elements.

$$V/Q = 0.6 \text{ mV/W},$$

$$NEP = 47 \text{ nW}/\sqrt{Hz}$$

Thus, the bulk-structured sensor element 40 has lower sensitivity and noise immunity than those of the sensor element including the thin-film thermoelectric conversion element shown in the first to third embodiments, but can obtain a signal equivalent to that of the Seebeck effect-based electromagnetic wave sensor. In addition, the thicknesses of the first thermoelectric conversion element 408 and the second thermoelectric conversion element 409 are larger than those of the thermoelectric conversion elements of the first to third embodiments, which leads to an advantage that an electric resistance value is small.

Figure 18:
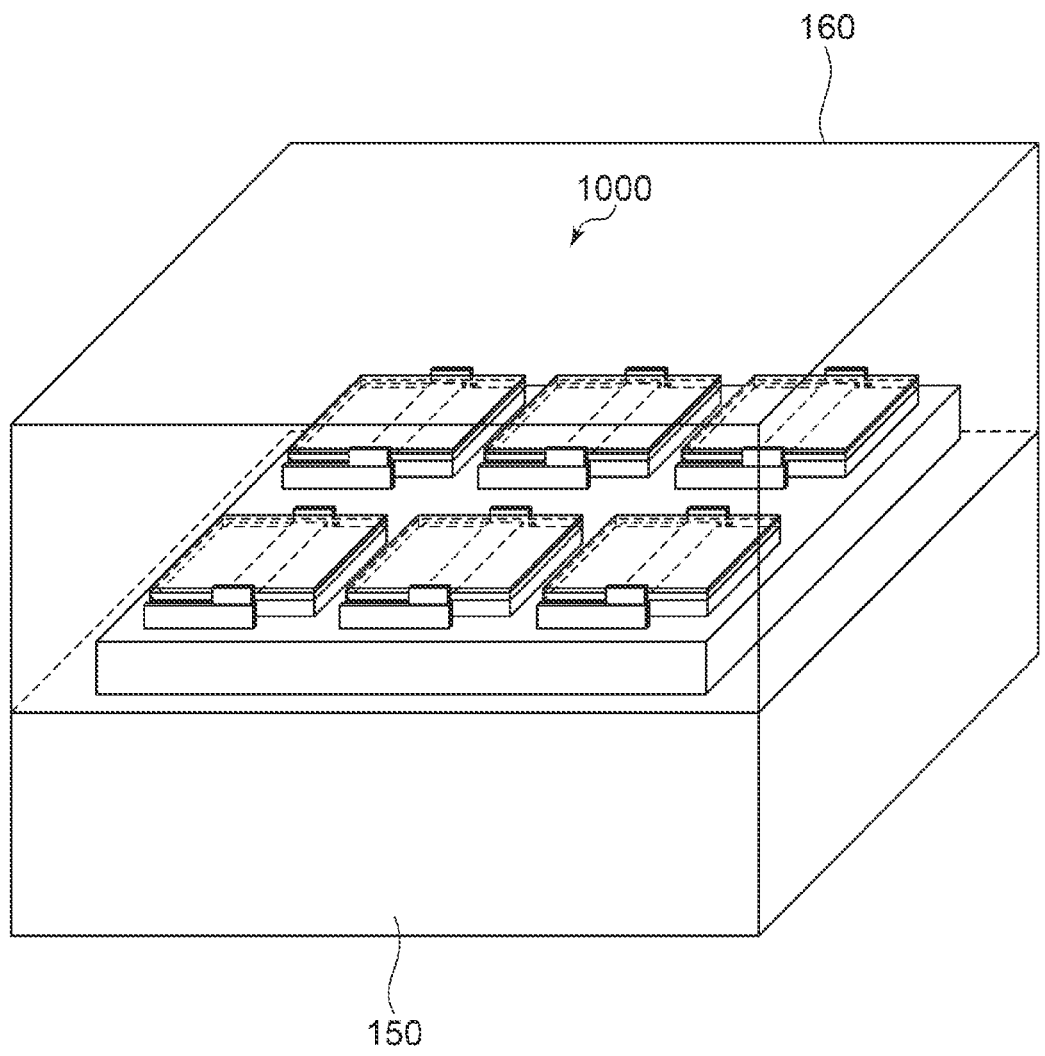
FIG. 18 is a schematic view of one example of packaging of a sensor device of each of the embodiments.

As shown in FIG. 18, the sensor elements or sensor devices of the embodiments described above are vacuum sealed within a housing 160. The housing 160 is made of a material that transmits electromagnetic waves in the target wavelength band. In order to improve efficiency, the housing 160 may be composed of a half mirror. A lower portion of the sensor elements or sensor devices is in contact with a heat bath 150 made of Cu or other metal, or kept at a constant temperature by a cooling device.

The sensor elements and sensor devices of the embodiments do not show phase transition like conventional bolometers, which makes it possible to detect electromagnetic waves with high signal linearity in a wide range. In addition, unlike the Seebeck effect-based electromagnetic wave sensors, the area of the absorber can be designed to be large, which allows the electromagnetic waves to be efficiently converted into heat.

REFERENCE SIGN LIST

10, 20, 30, 40: sensor element
102, 202, 302, 1002, 2002, 3002: substrate
104, 204, 304: absorber
106, 206, 306: high thermal conductive insulating film
108: thermoelectric conversion element
110, 210: low thermal conductive insulating film
112*a*, 112*b*, 212*a*, 212*b*, 213*a*, 213*b*, 312*a*, 312*b*, 313*a*, 313*b*: electrode
208, 308: first thermoelectric conversion element
209, 309: second thermoelectric conversion element
310: hollow region
1000, 2000, 3000: sensor device
1004, 2004, 3004: sensor structure
The invention claimed is:

1. A sensor element for detecting electromagnetic waves, comprising:
 a substrate;
 an absorber configured to absorb the electromagnetic waves and generate heat;
 at least one thermoelectric conversion element disposed between the substrate and the absorber to support a part of the absorber and configured to generate an electromotive force from the heat generated in the absorber by a transverse thermoelectric effect; and
 a first insulating film between the absorber and the at least one thermoelectric conversion element, the first insulating film being made of an insulating material with a higher thermal conductivity than that of a material of the at least one thermoelectric conversion element.

2. The sensor element according to claim 1, wherein
 the transverse thermoelectric effect is an anomalous Nernst effect.

3. The sensor element according to claim 1, further comprising a second insulating film as an interlayer dielectric film between the substrate and the first insulating film in a region where the at least one thermoelectric conversion element is not located, the second insulating film being made of an insulating material with a lower thermal conductivity than that of the material of the at least one thermoelectric conversion element.

4. The sensor element according to claim 1, wherein
 the at least one thermoelectric conversion element comprises a first thermoelectric conversion element and a second thermoelectric conversion element that have a rectangular cuboid shape and are located separately from each other in a direction perpendicular to a longitudinal direction,
 the sensor element further comprises a second insulating film as an interlayer dielectric film between the substrate and the first insulating film in a region where the first thermoelectric conversion element and the second thermoelectric conversion element are not located, and
 the second insulating film is made of an insulating material with a lower thermal conductivity than that of a material of the first thermoelectric conversion element and the second thermoelectric conversion element.

5. The sensor element according to claim 1, wherein
 the at least one thermoelectric conversion element comprises a first thermoelectric conversion element and a second thermoelectric conversion element that have a rectangular cuboid shape and are located separately from each other in a direction perpendicular to a longitudinal direction,
 the absorber and the first insulating film are supported at both ends by the first thermoelectric conversion element and the second thermoelectric conversion element to provide a bridge structure, and
 a vacuum hollow region is provided between the first thermoelectric conversion element and the second thermoelectric conversion element and between the substrate and the first insulating film.

6. A sensor device comprising:
 a substrate; and
 a plurality of sensor structures arranged in a matrix on the substrate, each of the plurality of sensor structures comprising:
  an absorber configured to absorb electromagnetic waves and generate heat;
  at least one thermoelectric conversion element disposed between the substrate and the absorber to support a part of the absorber and configured to generate an electromotive force from the heat generated in the absorber by a transverse thermoelectric effect; and
  a first insulating film between the absorber and the at least one thermoelectric conversion element, the first insulating film being made of an insulating material with a higher thermal conductivity than that of a material of the at least one thermoelectric conversion element.

\* \* \* \* \*